(12) United States Patent
Balachandran et al.

(10) Patent No.: US 8,155,701 B2
(45) Date of Patent: Apr. 10, 2012

(54) UPLINK RADIO FRAMES APPORTIONED FOR PLURAL MULTIPLE ACCESS TECHNOLOGIES

(75) Inventors: Kumar Balachandran, Cary, NC (US); Per Ernström, Stockholm (SE); Havish Koorapaty, Cary, NC (US); Rajaram Ramesh, Cary, NC (US); Kiran Thakare, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 617 days.

(21) Appl. No.: 12/259,068

(22) Filed: Oct. 27, 2008

(65) Prior Publication Data

US 2009/0131110 A1 May 21, 2009

Related U.S. Application Data

(60) Provisional application No. 60/986,062, filed on Nov. 7, 2007.

(51) Int. Cl.
*H04M 1/00* (2006.01)
(52) U.S. Cl. ........................ 455/561; 370/344
(58) Field of Classification Search .................. 455/561, 455/436, 509, 73; 370/329, 330, 335, 449, 370/468, 328, 208; 375/344, 260
See application file for complete search history.

(56) References Cited

U.S. PATENT DOCUMENTS

| 5,946,634 | A | 8/1999 | Korpela | |
|---|---|---|---|---|
| 2002/0080816 | A1* | 6/2002 | Spinar et al. | 370/449 |
| 2004/0081131 | A1 | 4/2004 | Walton et al. | |
| 2005/0063345 | A1* | 3/2005 | Wu et al. | 370/335 |
| 2005/0201325 | A1* | 9/2005 | Kang et al. | 370/328 |
| 2006/0018279 | A1* | 1/2006 | Agrawal et al. | 370/330 |
| 2006/0092892 | A1 | 5/2006 | Trachewsky | |
| 2006/0274852 | A1 | 12/2006 | Trachewsky | |
| 2007/0040703 | A1* | 2/2007 | Akkarakaran et al. | 340/961 |
| 2007/0064728 | A1 | 3/2007 | Nitta et al. | |
| 2007/0133388 | A1 | 6/2007 | Lee et al. | |

(Continued)

FOREIGN PATENT DOCUMENTS

EP  1 622 290  7/2005

(Continued)

OTHER PUBLICATIONS

3GPP TS 36.300 V8.2.0 (Sep. 2007) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

(Continued)

*Primary Examiner* — Lana N Le
*Assistant Examiner* — Golam Sorowar
(74) *Attorney, Agent, or Firm* — Nixon & Vanderhye P.C.

(57) ABSTRACT

Frames of information are communicated between a base station (28) of a radio access network (RAN) and plural types of wireless terminals (30). Frame handlers of the base station and of certain types of wireless terminals (30-2) process differing portions of the frame according to respective differing multiple access technologies. In differing embodiments and implementations, modulation techniques of the differing multiple access technologies can be apportioned to differing portions of the frame in various manners, such as (for example) to differing subframes of a multi-sub-framed frame or to differing burst fields or sections of an uplink (UL) burst.

15 Claims, 14 Drawing Sheets

U.S. PATENT DOCUMENTS

| | | | |
|---|---|---|---|
| 2007/0230416 | A1 | 10/2007 | Harris et al. |
| 2007/0286127 | A1 | 12/2007 | Inohiza |
| 2008/0151809 | A1 | 6/2008 | Chindapol et al. |
| 2008/0165881 | A1 | 7/2008 | Tao et al. |
| 2008/0232401 | A1 | 9/2008 | Ahmadi et al. |
| 2009/0116425 | A1 | 5/2009 | Lim et al. |
| 2009/0122771 | A1 | 5/2009 | Cai |
| 2009/0185476 | A1 | 7/2009 | Tsai et al. |
| 2009/0201860 | A1 | 8/2009 | Sherman et al. |

FOREIGN PATENT DOCUMENTS

| | | |
|---|---|---|
| EP | 1 798 883 A | 6/2007 |
| EP | 2 019 528 A | 1/2009 |
| EP | 2 026 616 A | 2/2009 |
| WO | 2005/109705 A | 11/2005 |
| WO | 2008/049028 | 4/2008 |
| WO | 2009/023808 A | 2/2009 |

OTHER PUBLICATIONS

3GPP TS 36.211 V8.0.0 (Sep. 2007) Technical Specification 3rd Generation Partnership Project; Technical Specification Group Radio Access Network; Evolved Universal Terrestrial Radio Access (E-UTRA); Physical channels and modulation (Release 8).

Koorapaty, Backward Compatible Use of Large Bandwidths for 802.16m, IEEE 802.16 Broadband Wireless Access Working Group <http://ieee802.org/16>. Jan. 16, 2008.

Related U.S. Appl. No. 12/138,000, filed Jun. 12, 2008; entitled Telecommunications Frame Structure Accommodating Differing Formats.

Related U.S. Appl. No. 12/170,579, filed Jul. 10, 2008, entitled Multiple Compatible OFDM Systems with Different Bandwidths.

Related U.S. Appl. No. 12/333,147, filed Dec. 11, 2008, entitled Ranging Procedure Identification of Enhanced Wireless Terminal.

Boone et al, "Strategies for Fast Scanning and Handovers in WiMax/802.16".

Kim, "IEEE 802.16/WiMax Security".

Supplementary EP Search Report mailed Nov. 24, 2010 in EP application 08847468.9.

Cudak et al, "Draft IEEE802.16m requirements", IEEE C802.16M-07/076, [Online] Mar. 5, 2007, pp. 1-146, XP002507326.

International Search Report mailed May 20, 200 in PCT Application No. PCT/SE2008/051451.

Ryu et al, "IEEE 802..16m Requirements on Legacy Support", Feb. 23, 2007, retrieved from the Internet URL: wireless.org/tgm/contrib./C80216m-07_037.pdf.

Chang et al, "CDMA Code Partitioning for a R-UL Ranging Control", Jan. 8, 2007, retrieved from the Internet URL: wireless.org/relay/contrib./C80216j-07_128.pdf.

Jeon et al "Dedicated Ranging Opportunity for RS", Mar. 5, 2007, retrieved from the Internet URL: wireless.org/relay/contrib./C80216j-07_175.pdf.

PCT International Preliminary Report on Patentability, dated Feb. 4, 2010 in PCT/SE2008/050922.

U.S. Final Office Action mailed Feb. 3, 2011 in U.S. Appl. No. 12/354,159.

U.S. Office Action mailed Aug. 2, 2010 in U.S. Appl. No. 12/354,159.

U.S. Office Action mailed May 12, 2011 in U.S. Appl. No. 12/138,000.

U.S. Office Action mailed Jun. 27, 2011 in U.S. Appl. No. 12/170,579.

Olik et al., "Single Carrier Uplink Frame Format", IEEE C802.16m-08/056, Jan. 16, 2007.

* cited by examiner

UPLINK RADIO FRAMES APPORTIONED FOR PLURAL MULTIPLE ACCESS TECHNOLOGIES

This application claims the priority and benefit of U.S. Provisional Patent Application 60/986,062, entitled "Backwards Compatible Implementation of SC-FDMA Uplink in WiMAX", filed Nov. 7, 2007, which is incorporated herein by reference in its entirety. This application is related to U.S. patent application Ser. No. 12/138,000, filed Jun. 12, 2008, entitled "Telecommunications Frame Structure Accommodating Differing Formats", which is also incorporated herein by reference in its entirety.

BACKGROUND

I. Technical Field

This invention pertains to telecommunications, and particularly to transmission of frames of information in wireless telecommunications.

II. Related Art and Other Considerations

In a typical cellular radio system, wireless terminals (also known as mobile terminals, mobile stations, and mobile user equipment units (UEs)) communicate via base stations of a radio access network (RAN) to one or more core networks. The wireless terminals (WT) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. The base station, e.g., a radio base station (RBS), is in some networks also called "NodeB" or "B node". The base stations communicate over the air interface (e.g., radio frequencies) with the wireless terminals which are within range of the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The radio access network in a UMTS network covers a geographical area which is divided into cells, each cell being served by a base station. Base stations may be connected to other elements in a UMTS type network such as a radio network controller (RNC). The Third Generation Partnership Project (3GPP or "3G") has undertaken to evolve further the predecessor technologies, e.g., GSM-based and/or second generation ("2G") radio access network technologies.

The IEEE 802.16 Working Group on Broadband Wireless Access Standards develops formal specifications for the global deployment of broadband Wireless Metropolitan Area Networks. Although the 802.16 family of standards is officially called WirelessMAN, it has been dubbed WiMAX" (from "Worldwide Interoperability for Microwave Access") by an industry group called the WiMAX Forum.

IEEE 802.16e-2005 (formerly known as IEEE 802.16e) is in the lineage of the specification family and addresses mobility by implementing, e.g., a number of enhancements including better support for Quality of Service and the use of Scalable OFDMA. In general, the 802.16 standards essentially standardize two aspects of the air interface—the physical layer (PHY) and the Media Access Control layer (MAC).

Concerning the physical layer, IEEE 802.16e uses scalable OFDMA to carry data, supporting channel bandwidths of between 1.25 MHz and 20 MHz, with up to 2048 sub-carriers. IEEE 802.16e supports adaptive modulation and coding, so that in conditions of good signal, a highly efficient 64 QAM coding scheme is used, whereas where the signal is poorer, a more robust BPSK coding mechanism is used. In intermediate conditions, 16 QAM and QPSK can also be employed. Other physical layer features include support for Multiple-in Multiple-out (MIMO) antennas in order to provide good performance in NLOS (Non-line-of-sight) environments and Hybrid automatic repeat request (HARQ) for good error correction performance.

In terms of Media Access Control layer (MAC), the IEEE 802.16e encompasses a number of convergence sublayers which describe how wireline technologies such as Ethernet, ATM and IP are encapsulated on the air interface, and how data is classified, etc. It also describes how secure communications are delivered, by using secure key exchange during authentication, and encryption during data transfer. Further features of the MAC layer include power saving mechanisms (using Sleep Mode and Idle Mode) and handover mechanisms.

The IEEE standard 802.16m is intended to be an evolution of IEEE standard 802.16e with the aim of higher data rates and lower latency. There is a requirement for backward compatibility between IEEE standard 802.16m and its IEEE standard 802.16e predecessor. Yet, the frame structure of IEEE standard 802.16e poses problems for backward compatibility.

The frame structure for IEEE standard 802.16e is shown in FIG. 1. The frame length for IEEE standard 802.16e is 5 ms, and uses time division duplex (TDD). The preamble is used by mobile stations to synchronize to the downlink (DL), and the DL-MAP and UL-MAP messages that occur just following the preamble give allocation information to the mobile stations on the downlink and the uplink. Examples of downlink and uplink allocations are shown in FIG. 1. The transmit transition gap (TTG) and the receive transition gap (RTG) are gaps used for the mobile station to switch from receive to transmit and vice versa.

As mentioned above, presently WiMAX utilizes orthogonal frequency division multiple access (OFDMA). Like OFDM, OFDMA transmits a data stream by dividing the data stream over several narrow band sub-carriers (e.g. 512, 1024 or even more depending on the overall available bandwidth [e.g., 5, 10, 20 MHz] of the channel) which are transmitted simultaneously. The sub-carriers are divided into groups of sub-carriers, each group also being referred to as a sub-channel. The sub-carriers that form a sub-channel need not be adjacent. As many bits are transported in parallel, the transmission speed on each sub carrier can be much lower than the overall resulting data rate. This is important in a practical radio environment in order to minimize effect of multipath fading created by slightly different arrival times of the signal from different directions.

With all of its advantages, WiMAX mobile does have a number of problems. Among its problems is the fact that the use of orthogonal frequency division multiple access (OFDMA), with its inherent large peak to average power ratio (PAPR), in the uplink makes user terminals complex and expensive.

There are some current solutions which seek to solve such OFDMA-related/caused problems. As one example, the use of single carrier frequency division multiple access (SC-FDMA) modulation as in long term evolution (LTE) has been proposed. Single Carrier Frequency Division Multiple Access (SC-FDMA) also transmits data over the air interface in many sub-carriers but adds an additional processing step (using, e.g., a Fast Fourier Transformation (FFT) function)

for spreading the information of each bit over all the subcarriers. SC-FDMA is sometimes also referred to as "FFT spread OFDM".

As used herein, "SC-FDMA" encompasses but is not limited to SC-FDMA as described in 3GPP TS 36.300 V8.2.0 (2007-09) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) and 3GPP TS 36.211 V8.0.0 (2007-09) Technical Specification 3rd Generation Partnership Project; Technical Specification Group Radio Access Network; Evolved Universal Terrestrial Radio Access (E-UTRA); Physical channels and modulation (Release 8) and can also be referred to as DFTS-OFDM.

Use of technology such as SC-FDMA modulation in a WiMAX system having the currently envisioned frame structure may inhibit or even be antithetical to backward compatibility.

What is needed, therefore, and an object of the present invention, is one or more of method, apparatus, and techniques to introduce these features in a backwards-compatible manner.

BRIEF SUMMARY

In one of its aspects the technology concerns a base station (of a radio access network) which comprises a transceiver and a frame handler. The transceiver is configured to communicate a frame of information over an air interface with a wireless terminal participating in a connection with the base station. The frame handler of the base station processes differing (e.g., different) portions of the frame according to respective differing multiple access technologies. In differing embodiments and implementations, modulation techniques of the differing multiple access technologies can be apportioned to differing portions of the frame in various manners. As used herein, "differing portions" of a frame encompasses (for example) "differing portions" of a frame encompasses (for example) differing subframes of a multi-sub-framed frame, differing bursts, differing burst fields or sections of a burst, and differing zones. In differing embodiments, the differing multiple access technologies can be utilized for uplink portions of the frames, or for downlink portions of the frames, or (in some embodiments) both for uplink portions and downlink portions of the frames.

In one example embodiment, the frame handler of the base station prepares and/or processes the frame as plural subframes. In this extended mode, the frame handler is arranged with a capability of preparing and/or processing differing ones of the plural subframes as being formatted according to the respective differing multiple access technologies. For example, the frame handler of the base station can process one subframe of the frame according to a first type of multiple access technology and can process another subframe of the frame according to a second type of multiple access technology. In an example implementation, the first type of multiple access technology is orthogonal frequency division multiple access (OFDMA) and the second type of multiple access is single carrier frequency division multiple access (SC-FDMA).

In an example implementation of the first example embodiment, each subframe can comprise a downlink burst followed by an uplink burst. The frame handler of the base station is further arranged to process the frame whereby a first uplink burst of a first subframe is demodulated according to the second type of multiple access technology and whereby a second uplink burst of a second subframe is demodulated according to the first type of multiple access technology.

Thus, in an example embodiment, the frame handler of the base station is arranged to process the frame regardless of whether the wireless terminal with which the base station communicates is a first type of wireless terminal (e.g., capable of utilizing the first type of multiple access technology) or whether the wireless terminal is a second type of wireless terminal (e.g., capable of utilizing both the first type of multiple access technology and a second type of multiple access technology). Each subframe comprises a downlink burst followed by an uplink burst. In an example embodiment, the frame handler of the base station is arranged to process the frame whereby a first uplink burst of a first subframe is demodulated according to the second type of multiple access technology if the wireless terminal is the second type of wireless terminal and whereby a second uplink burst of a second subframe is demodulated according to the first type of multiple access technology.

In an example embodiment, preferably reception of the first uplink burst of the first subframe precedes in time reception of the second uplink burst of the second subframe In another example embodiment the frame handler of the base station is arranged to dynamically select whether to process at least one subframe of the frame according to a first multiple access technology or a second multiple access technology For example, in one example implementation the frame handler of the base station is arranged to process an uplink burst of a first subframe according to the second multiple access technology and to dynamically select whether to process an uplink burst of a second subframe according to either the first multiple access technology or the second multiple access technology.

In another example embodiment, the frame handler of the base station caters to a frame structure wherein the frame comprises an uplink burst comprising plural burst fields. The frame handler of this example embodiment is arranged to process differing ones of the plural burst fields as being formatted according to the respective differing multiple access technologies. In an example implementation wherein the frame comprises a downlink burst, and the frame handler of the base station is arranged to associate in the downlink burst at least one of the plural burst fields as belonging to a first multiple access technology and at least one of the plural burst fields as belong to the second multiple access technology.

In another of its aspects, the technology concerns a wireless terminal which participates in a connection with a base station of a radio access network. The wireless terminal comprises a transceiver and a frame handler. The transceiver is configured for communicating a frame over an air interface with a base station. The frame handler is arranged to process the frame according to respective differing multiple access technologies. In one example embodiment the frame handler is arranged to modulate differing uplink portions of the frame according to respective differing multiple access technologies; in another example embodiment the frame handler is arranged to demodulate differing downlink portions of the frame according to respective differing multiple access technologies.

In an example embodiment, the frame handler of the wireless terminal is arranged to prepare the uplink portions of the frame according to the respective differing multiple access technologies. In an example implementation of this embodiment the frame handler is arranged to prepare one subframe of the frame according to a first type of multiple access technology and to prepare another subframe of the frame according to a second type of multiple access technology.

In an example implementation, the first type of multiple access technology is orthogonal frequency division multiple access (OFDMA) and the second type of multiple access is single carrier frequency division multiple access (SC-FDMA).

In an example implementation wherein each subframe comprises a downlink burst followed by an uplink burst, the frame handler of the wireless terminal is further arranged to prepare the frame whereby a first uplink burst of a first subframe is modulated according to the second type of multiple access technology and whereby a second uplink burst of a second subframe is modulated according to the first type of multiple access technology.

In an example implementation, transmission of the first uplink burst of the first subframe precedes in time transmission of the second uplink burst of the second subframe.

In another example embodiment, the frame handler of the wireless terminal is arranged to dynamically determine (based on content of a downlink burst of the frame) whether to prepare at least one subframe of the frame according to a first multiple access technology or a second multiple access technology.

In another example embodiment, the frame handler of the wireless terminal is arranged to prepare an uplink burst of a first subframe according to the second multiple access technology and to dynamically determine (based on content of a downlink burst of the frame) whether to prepare an uplink burst of a second subframe according to either the first multiple access technology or the second multiple access technology.

In another example embodiment, the frame comprises an uplink burst comprising plural burst fields. The frame handler of the wireless terminal is arranged to prepare differing ones of the plural burst fields as being formatted according to the respective differing multiple access technologies. In an example implementation, the frame comprises a downlink burst, and the frame handler of the wireless terminal is arranged to determine from the downlink burst at least one of the plural burst fields as belonging to a first multiple access technology and at least one of the plural burst fields as belonging to the second multiple access technology.

Yet another aspect of the technology concerns a method of operating a radio access network (comprising a base station) which communicates over a radio interface with plural types of wireless terminals using frames of information. The method comprises transmitting at least a downlink portion of the frames to a first type of wireless terminal and a second type of wireless terminal; at the first type of wireless terminal, preparing a first part of an uplink portion of the frames according to a first type of multiple access technology; and, at the second type of wireless terminal, preparing at least a second part of the uplink portion of the frames according to a second type of multiple access technology.

In an example mode, the method further comprises, at the second type of wireless terminal, preparing the first part of the uplink portion of the frames according to the first type of multiple access technology.

In an example mode, the method further comprises the wireless terminal preparing the frames as plural subframes, with differing ones of the plural subframes being formatted according to the respective differing multiple access technologies. For example, the wireless terminal can prepare one subframe of the frames according to a first type of multiple access technology and to prepare another subframe of the frames according to a second type of multiple access technology. In an example implementation, the first type of multiple access technology is orthogonal frequency division multiple access (OFDMA) and the second type of multiple access is single carrier frequency division multiple access (SC-FDMA).

In an example mode, each subframe comprises a downlink burst followed by an uplink burst. In this example mode the method can further comprise the wireless terminal preparing the frame whereby a first uplink burst of a first subframe is modulated according to the second type of multiple access technology and whereby a second uplink burst of a second subframe is modulated according to the first type of multiple access technology.

An example mode further comprises the base station processing the frame regardless of whether the wireless terminal is a first type of wireless terminal capable of utilizing the first type of multiple access technology or whether the wireless terminal is a second type of wireless terminal capable of utilizing both the first type of multiple access technology and a second type of multiple access technology. Each subframe comprises a downlink burst followed by an uplink burst, the base station processing the frame whereby a first uplink burst of a first subframe is demodulated according to the second type of multiple access technology if the wireless terminal is the second type of wireless terminal and whereby a second uplink burst of a second subframe is demodulated according to the first type of multiple access technology.

In another example mode, the method further comprises the wireless terminal dynamically determining (in accordance with content of a downlink burst of a specific frame) whether to prepare at least one subframe of the specific frame according to a first multiple access technology or a second multiple access technology. In an example implementation, the wireless terminal prepares an uplink burst of a first subframe according to the second multiple access technology and dynamically determines whether to prepare an uplink burst of a second subframe according to either the first multiple access technology or the second multiple access technology.

In an example mode, the method further comprises formatting the frame to comprise an uplink burst comprising plural burst fields; and, preparing differing ones of the plural burst fields as being formatted according to the respective differing multiple access technologies. An example implementation of this mode further comprises including a downlink burst in the frames; and designating in the downlink burst at least one of the plural burst fields as belonging to the first multiple access technology and at least one of the plural burst fields as belong to the second multiple access technology.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 2:
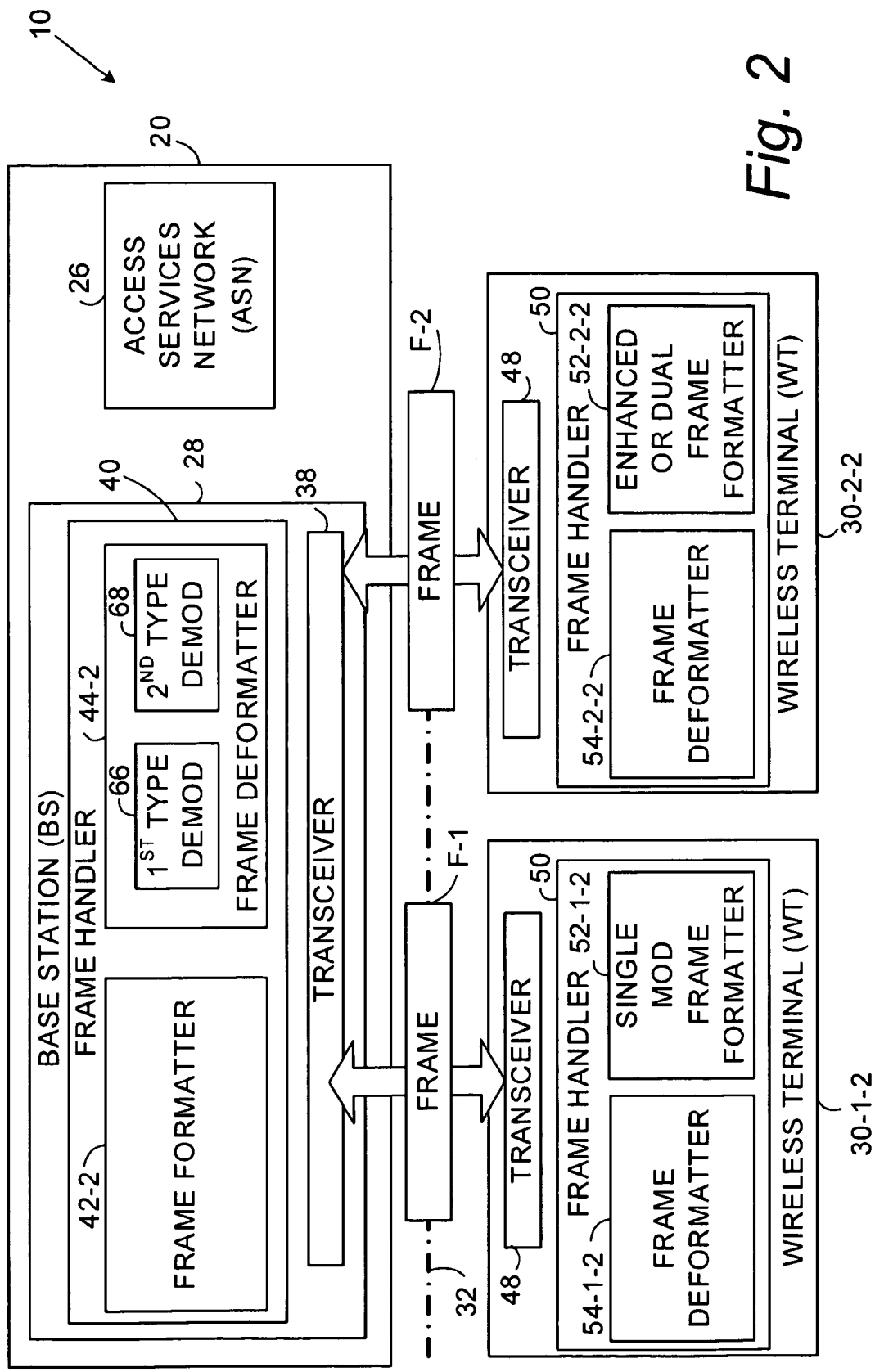
FIG. 2 is a schematic view of an example telecommunications system which serves as an example suitable environment for implementation of a multiple access technology-apportioned frame structure on the uplink.

The technology described herein is advantageously illustrated in the example, non-limiting, context of a telecommunications system 10 such as that schematically depicted in FIG. 2. The example telecommunications system 10 of FIG. 2 shows a radio access network 20 which can be connected to one or more external (e.g., core) networks. The external networks may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

The radio access network (RAN) 20 can, at least in some embodiments, include an access services network (ASN) 26 and one or more radio base stations (RBS) 28. For sake of simplicity, the radio access network (RAN) 20 of FIG. 2 is shown as comprising one base station node (BS) 28. Those skilled in the art will also appreciate that a base station is sometimes also referred to in the art as a radio base station, a node B, eNodeB 28, or B-node (all of which are used interchangeably herein).

Wireless terminals (WT) can communicate with one or more cells or one or more base stations (BS) 28 over a radio or air interface 32. In differing implementations, the wireless terminal (WT) 30 can be known by different names, such as mobile terminal, mobile station or MS, user equipment unit (UE), handset, or remote unit, for example. Each wireless terminal (WT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc.

FIG. 2 happens to illustrate two wireless terminals, e.g., wireless terminal (WT) 30-1 and wireless terminal (WT) 30-2. As explained by way of examples hereinafter, the wireless terminal (WT) 30-1 is referenced herein as a first type of wireless terminal in the sense that it operates in accordance with only a first type of multiple access technology (MAT), e.g., a first type of data modulation. The wireless terminal (WT) 30-2 is referenced herein as a second type of wireless terminal in the sense that it can operate either (1) in accordance with a second type of multiple access technology (e.g., a second type of data modulation) or (2) in accordance with both the second type of multiple access technology and the first type of multiple access technology.

As shown in FIG. 2, in an example embodiment base station 28 comprises transceiver 38 and frame handler 40. Transceiver 38 is involved in communicating frame(s) of information (illustrated as frames F in FIG. 2) over an air interface with a wireless terminal participating in a connection with the base station. The transceiver 38 includes both a transmitter(s) for transmitting downlink (DL) portions or bursts of frames, as well as a receiver(s) for receiving uplink (UL) portions or bursts of frames. As used herein, "transceiver" can include one or more transceivers and further encompasses radio transmission and/or reception equipment suitable for transmitting/receiving a data stream or the like in the form of plural sub-carriers or subchannels (such as in OFDMA and SC-FDMA, for non-limiting examples), including plural antennas when appropriate.

The frame handler 40 of base station 28 is involved in processing frame(s) F which are communicated between base station 28 and wireless terminal (WT) 30. More detailed aspects of structure and composition of plural embodiments of the frames F are discussed subsequently. Since in this technology the frame(s) have both downlink (DL) portions or bursts and uplink (UL) portions or bursts, the frame handler 40 of base station 28 in turn comprises frame formatter 42-2 (which facilitates preparation of the downlink (DL) bursts prior to transmission by transceiver 38) and frame deformatter 44-2 (which facilitates processing of the uplink (UL) bursts as received by transceiver 38 from wireless terminal (WT) 30). In an example embodiment, frame handler 40, as well as its frame formatter 42-2 and deformatter 44-2, can be realized by one or more processors or controllers as those terms are herein expansively explained.

For sake of simplicity, FIG. 2 does not show other well-known functionalities and/or units of base station 28, such as (by way of non-limiting example) interfaces to other nodes of the radio access network (RAN); queues through which data is collected or assembled preparatory to inclusion in the downlink (DL) bursts configured by frame formatter 42-2; generators or processors for preparing signaling information for inclusion in the downlink (DL) bursts configured by frame formatter 42-2; queues into which data obtained from uplink (UL) bursts are stored after processed by deformatter 44-2; units of base station 28 which utilize the data and/or signaling included in uplink (UL) bursts; or node processors or the like which supervise or coordinate the constituent units or functionalities of base station 28.

FIG. 2 further shows example implementations of wireless terminals, (e.g., wireless terminal (WT) 30-1-2 and wireless terminal (WT) 30-2-2) which participate in respective connections with base station 28. Despite being of differing types, in a generic sense wireless terminal (WT) 30-1-2 and wireless terminal (WT) 30-2-2 both comprise transceiver 48 and wireless terminal frame handler 50. Transceiver 48 is configured for communicating frames F over air interface 32 with base station 28, and comprises a receiver for receiving downlink (DL) bursts of the frames from base station 28 and a transmitter for transmitting uplink (UL) bursts of the frames to base station 28. Again for sake of simplicity, FIG. 2 does not show other well-known functionalities and/or units of wireless terminal (WT) 30-1-2 and wireless terminal (WT) 30-2-2, such as (by way of non-exhaustive example) processors or the like which execute one or more applications at the wireless terminals (WT). It will be appreciated, however, that wireless terminal frame handler including one or more of its wireless terminal frame formatter and wireless terminal deformatter can be realized by processor(s) or controller(s) as those terms are herein expansively described.

In the embodiment of FIG. 2, the downlink content for all frames as prepared by frame formatter 42-2 of base station 28 can be of a same multiple access technology. However, the uplink content of the frame can be either in accordance with a first type of multiple access technology (e.g., a first type of data modulation) or a second type of multiple access technology (e.g., a second type of data modulation).

As mentioned above, the wireless terminal (WT) 30-1-2 is a first type of wireless terminal (e.g., a legacy wireless terminal) and operates in accordance with only a first type of multiple access technology, e.g., a first type of data modulation. To this end, frame handler 50 of wireless terminal (WT) 30-1-2 comprises a single type modulation type frame formatter 52-1-2 and frame deformatter 54-1-2. Wireless terminal frame formatter 52-1-2 serves, e.g., to prepare uplink (UL) bursts of the frames prior to transmission to base station 28 by transceiver 48. Wireless terminal deformatter 54-1-2 serves, e.g., to process downlink (DL) bursts received by transceiver 48 over air interface 32 from base station 28. In being "single type" the frame formatter 52 is configured to operate according to only one type of multiple access technology. FIG. 2 shows wireless terminal (WT) 30-1-2 communicating/exchanging frame F-1 with base station 28 over air interface 32.

By contrast, wireless terminal (WT) 30-2-2 is a second type of wireless terminal which, because of enhancements or advancements (for example), can operate in accordance with plural types of multiple access technology. For example, wireless terminal (WT) 30-2-2 can operate either (1) in accordance with a second type of multiple access technology (e.g., a second type of data modulation) or (2) both in accordance with the second type of multiple access technology and the first type of multiple access technology. To this end, frame formatter 52-2-2 of wireless terminal (WT) 30-2-2 is an enhanced type frame formatter 52 capable of enhanced modulation, e.g., capable of modulating some or all information in accordance with a second or enhanced type of modulation (e.g., second multiple access technology). The enhanced type frame formatter 52-2-2 can be a dual modulation type frame formatter when it can also modulate information, when necessary, according to the first type of multiple access technology. Thus, by "dual" is meant that these constituent units of frame handler 40 of wireless terminal (WT)

Figure 4:
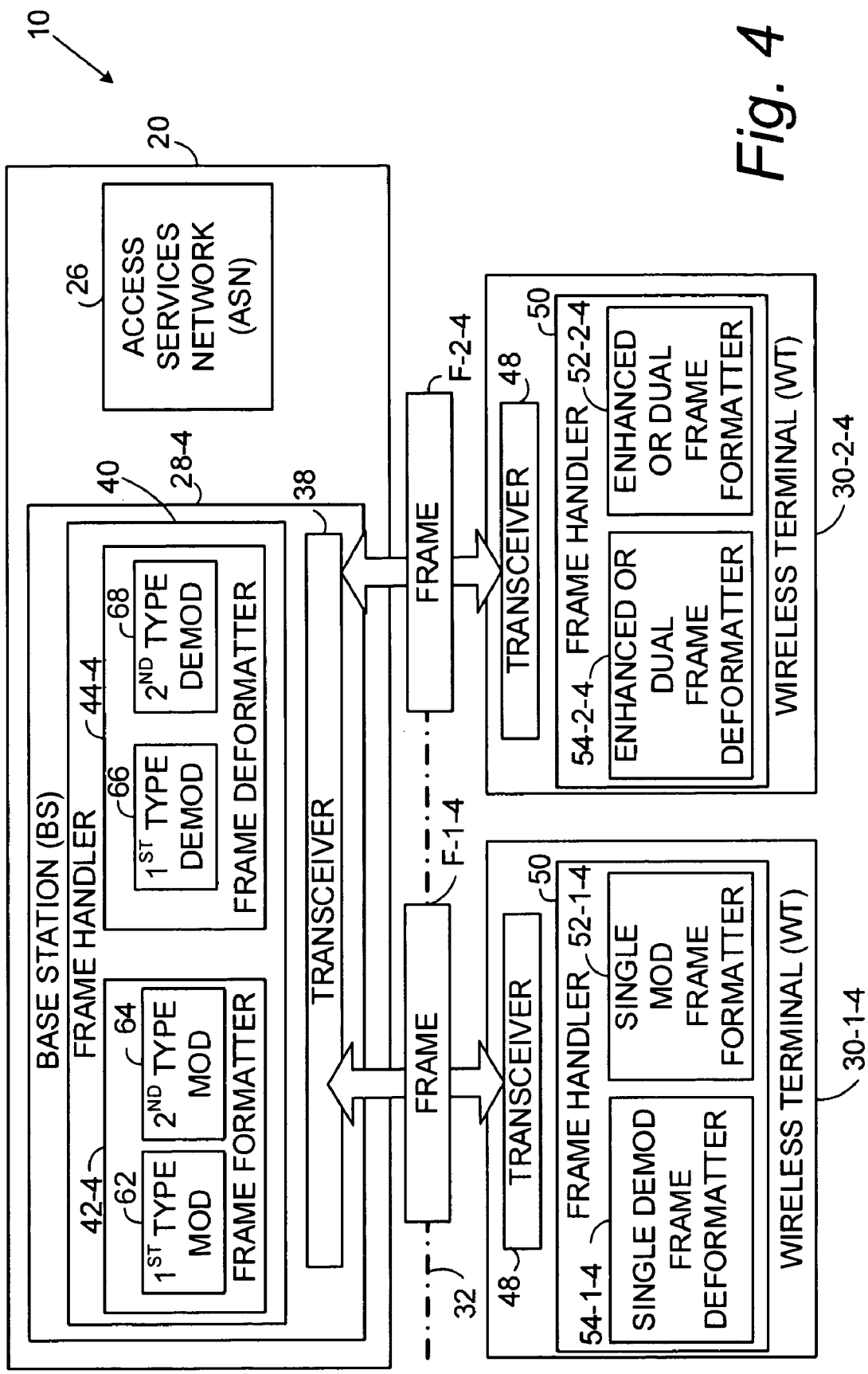
FIG. 4 is a schematic view of an example telecommunications system which serves as an example suitable environment for implementation of a multiple access technology-apportioned frame structure both on the uplink and the downlink.

30-2-2 can operate in conjunction with plural types of multiple access technologies. Frame deformatter 54-2-2 of wireless terminal (WT) 30-2-2 is capable of demodulating the downlink content of the frame as prepared by frame formatter 42-2 of base station 28. Thus, frame handler 50 of wireless terminal (WT) 30-2-2 is arranged to receive a downlink portion of the frame and to prepare differing uplink portions of the frame according to respective differing multiple access technologies. FIG. 4 shows wireless terminal (WT) 30-2-2 communicating/exchanging frame F-2 with base station 28 over air interface 32.

Since at least wireless terminal (WT) 30-2-2 is equipped to utilize plural multiple access technologies (e.g., to prepare frames having at least one portion prepared in accordance with the first multiple access technology and at least one portion prepared in accordance with the second multiple access technology), base station 28 must be comparably equipped. To this end, for processing frames received from the wireless terminals (WT) over the radio interface 32, deformatter 44-2 of base station 28 comprises first type demodulator 66 and second type demodulator 68. The first type demodulator 66 is configured to demodulate information (e.g., data and signaling) according to the first type of multiple access technology; second type demodulator 68 is configured to demodulate information (e.g., data and signaling) according to the second type of multiple access technology.

Figure 3:
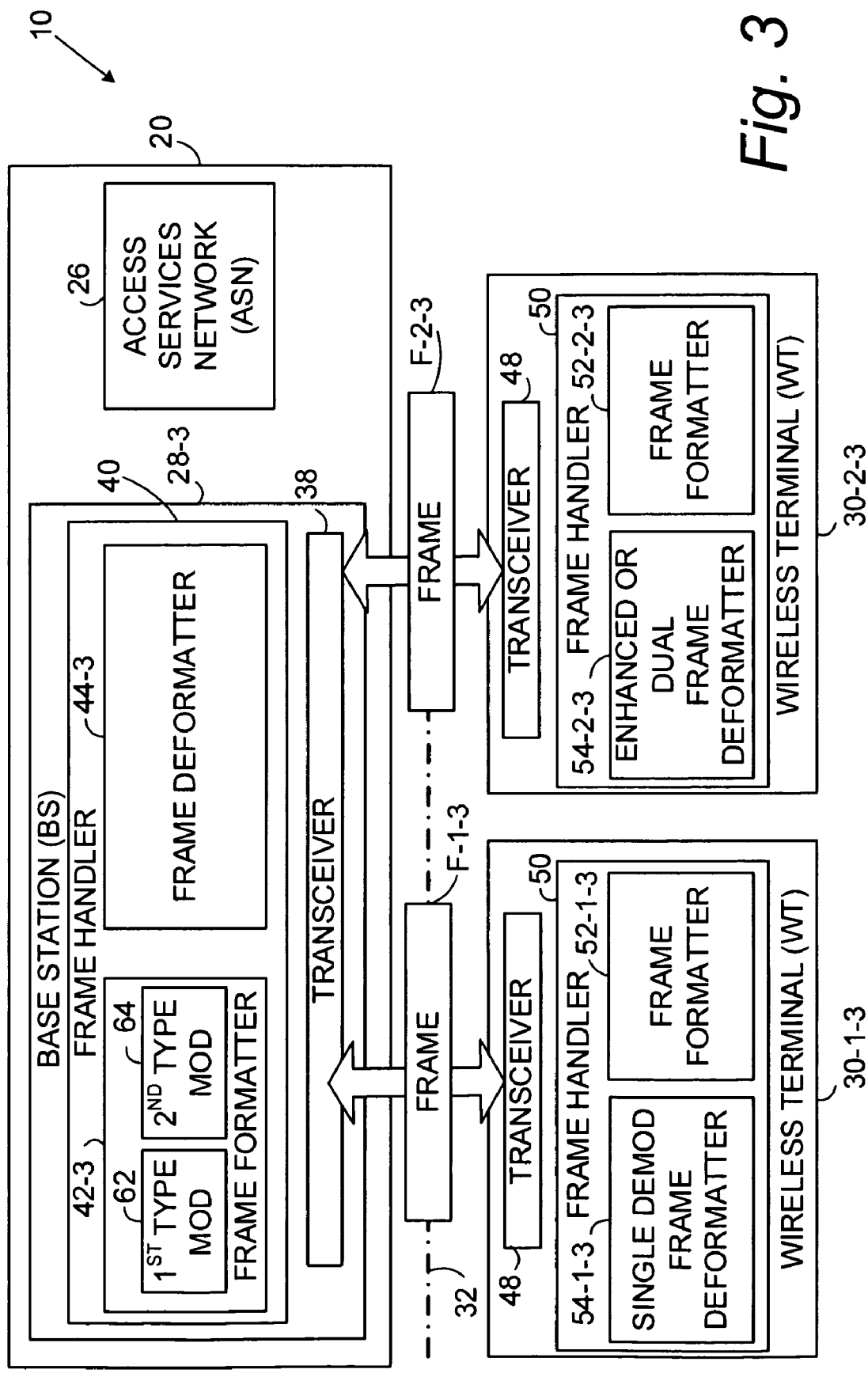
FIG. 3 is a schematic view of an example telecommunications system which serves as an example suitable environment for implementation of a multiple access technology-apportioned frame structure on the downlink.

FIG. 2 thus illustrates a situation or scenario in which a base station such as base station 28 can receive, in a single frame on the uplink, content expressed in multiple/differing multiple access technologies. By contrast, FIG. 3 illustrates a situation or scenario in which a base station such as base station 28-3 can transmit, in a single frame on the downlink, content expressed in multiple/differing multiple access technologies. To this end, the base station 28-3 of FIG. 3 has its frame formatter 42-3 shown as comprising first type modulator 62 and second type modulator 64. The first type modulator 62 is configured to modulate information (e.g., data and signaling) according to the first type of multiple access technology; the second type modulator 64 is configured to modulate information (e.g., data and signaling) according to the second type of multiple access technology.

In FIG. 3, the wireless terminal (WT) 30-1-3 is a first type of wireless terminal (e.g., a legacy wireless terminal) and operates in accordance with only a first type of multiple access technology, e.g., a first type of data demodulation. To this end, frame handler 50 of wireless terminal (WT) 30-1-3 comprises a single type modulation type frame deformatter 54-1-3 as well as frame formatter 52-1-3. Wireless terminal deformatter 54-1-3 serves, e.g., to process downlink (DL) bursts received by transceiver 48 over air interface 32 from base station 28-3 in accordance with a single type of multiple access technology, e.g., the first type of data demodulation. Wireless terminal frame formatter 52-1-3 serves, e.g., to prepare uplink (UL) bursts of the frames prior to transmission to base station 28-3 by transceiver 48. FIG. 3 shows wireless terminal (WT) 30-1-3 communicating/exchanging frame F-1-3 with base station 28-3 over air interface 32.

By contrast, wireless terminal (WT) 30-2-3 is a second type of wireless terminal which, because of enhancements or advancements (for example), can operate in accordance with plural types of multiple access technology. For example, wireless terminal (WT) 30-2-3 can receive frames that are formatted either (1) in accordance with a second type of multiple access technology (e.g., a second type of data modulation) or (2) both in accordance with the second type of multiple access technology and the first type of multiple access technology. To this end, frame deformatter 54-2-3 of wireless terminal (WT) 30-2-3 is an enhanced type frame deformatter capable of enhanced modulation, e.g., capable of modulating some or all information in accordance with a second or enhanced type of modulation (e.g., second multiple access technology). The frame formatter 52-2-3 serves to prepare uplink (UL) bursts of the frames prior to transmission to base station 28 by transceiver 48. FIG. 3 shows wireless terminal (WT) 30-2-3 communicating/exchanging frame F-2-3 with base station 28-3 over air interface 32.

FIG. 4 illustrates a situation or scenario in which a base station such as base station 28-4 can, in a single frame, both receive in the uplink and transmit in the downlink content expressed in multiple/differing multiple access technologies. The base station 28-4 of FIG. 4 thus combines the capabilities of the embodiments of FIG. 2 and FIG. 3. As such, the frame formatter 42-4 of base station 28-4 comprises first type modulator 62 and second type modulator 64; the frame deformatter 44-4 of base station 28-4 comprises first type demodulator 66 and second type demodulator 68. FIG. 4 illustrates two wireless terminals, e.g., wireless terminal (WT) 30-1-4 and wireless terminal (WT) 30-2-4. The wireless terminal (WT) 30-1-4 is referenced herein as a first type of wireless terminal in the sense that it operates in accordance with only a first type of multiple access technology, e.g., a first type of data modulation/demodulation. The wireless terminal (WT) 30-2-4 is referenced herein as a second type of wireless terminal in the sense that it can operate either (1) in accordance with a second type of multiple access technology (e.g., a second type of data modulation/demodulation) or (2) in accordance with both the second type of multiple access technology and the first type of multiple access technology.

Frame handler 50 of wireless terminal (WT) 30-1-4 comprises a single modulation type frame formatter 52-1-4 and single type demodulation terminal deformatter 54-1-4. The wireless terminal frame formatter of wireless terminal (WT) 30-1-4 serves, e.g., to prepare uplink (UL) bursts of the frames prior to transmission to base station 28-4 by transceiver 48. Wireless terminal deformatter 54-1-4 serves, e.g., to process downlink (DL) bursts received by transceiver 48 over air interface 32 from base station 28-4. In being "single type" both frame formatter 52-1-4 and deformatter 54-1-4 are configured to operate according to only one type of multiple access technology. FIG. 4 shows wireless terminal (WT) 30-1-4 communicating/exchanging frame F-1-4 with base station 28-4 over air interface 32.

By contrast, wireless terminal (WT) 30-2-4 is a second type of wireless terminal which, because of enhancements or advancements (for example), can operate in accordance with plural types of multiple access technology. For example, wireless terminal (WT) 30-2-4 can operate either (1) in accordance with a second type of multiple access technology (e.g., a second type of data modulation/demodulation) or (2) both in accordance with the second type of multiple access technology and the first type of multiple access technology. To this end, frame formatter 52-2-4 of wireless terminal (WT) 30-2-4 is an enhanced type frame formatter capable of enhanced modulation, e.g., capable of modulating some or all information in accordance with a second or enhanced type of modulation (e.g., second multiple access technology). The enhanced type frame formatter can be a dual modulation type frame formatter when it can also modulate information, when necessary, according to the first type of multiple access technology. Similarly, frame deformatter 54-2-4 of wireless terminal (WT) 30-2-4 is an enhanced type frame deformatter, e.g., capable of demodulating some or all information in accordance with a second or enhanced type of modulation (e.g., second multiple access technology). The enhanced type frame deformatter can thus also be a dual modulation type frame deformatter when it can also demodulate information, when necessary, according to the first type of multiple access technology. Thus, by "dual" is meant that these constituent units of the frame handler of wireless terminal (WT) 30-2-4 can operate in conjunction with plural types of multiple access technologies. In particular, frame handler 40-2-4 of wireless terminal (WT) 30-2-4 is arranged to receive a downlink portion of the frame and to prepare differing uplink portions of the frame according to respective differing multiple access technologies. FIG. 4 shows wireless terminal (WT) 30-2-4 communicating/exchanging frame F-2-4 with base station 28-4 over air interface 32.

The first type of multiple access technology and the second type of multiple access technology can be any two differing (e.g., different) multiple access technologies. Typically, but not exclusively, the first type of multiple access technology is an older or previously-used type of multiple access technology, while the second type of technology is a newer, more advanced, or enhanced multiple access technology.

Figure 4A:
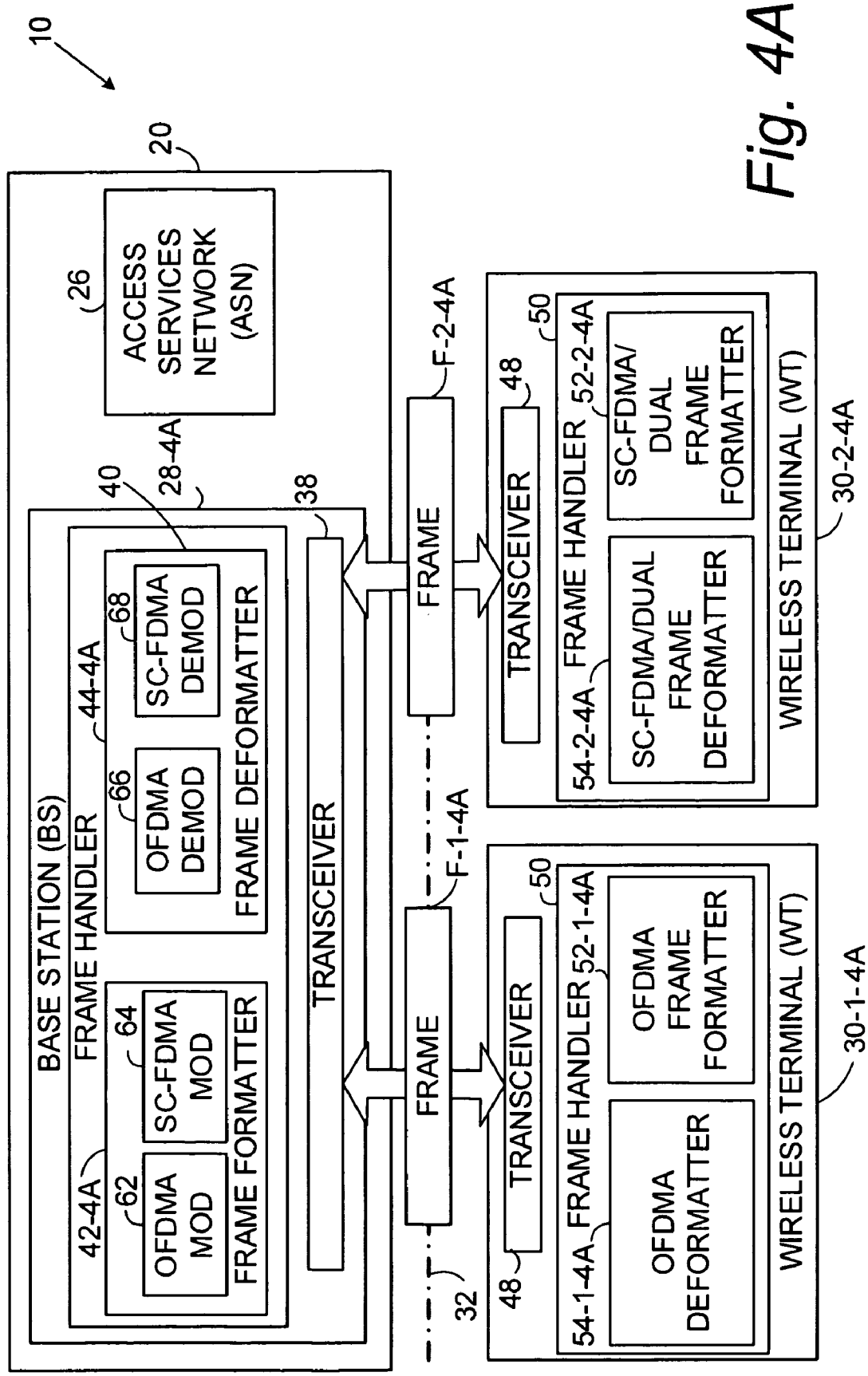
FIG. 4A is a schematic view of an example implementation of the telecommunications system of the embodiment of FIG. 4 wherein a first type of multiple access technology is or comprises orthogonal frequency division multiple access (OFDMA) and a second type of multiple access is or comprises single carrier frequency division multiple access (SC-FDMA), and wherein a second type wireless terminal has dual multiple access technology capability.

In one non-limiting example implementation illustrated in FIG. 4A, the first type of multiple access technology is or comprises orthogonal frequency division multiple access (OFDMA) and the second type of multiple access is or comprises single carrier frequency division multiple access (SC-FDMA). Thus, in the FIG. 4A example embodiment, in base station 28-4A the first type modulator 62 is an OFDMA modulator while the second type modulator 64 is an SC-FDMA modulator. Likewise, the first type demodulator 66 of base station 28-4A is an OFDMA demodulator while the second type demodulator 68 is an SC-FDMA demodulator. In the FIG. 4A embodiment, the deformatter 54-1-4A of wireless terminal (WT) 30-1-4A comprises an OFDMA demodulator and formatter 52-1-4A comprises an OFDMA modulator. For wireless terminal (WT) 30-2-4A, on the other hand, which is capable of a second or enhanced multiple access technology, frame formatter 52-2-4A comprises a SC-FDMA/dual modulator. Optionally, deformatter 54-2-4A can comprises a SC-FDMA/dual demodulator, or whatever type of demodulator is necessary for demodulating information transmitted on the downlink (DL).

Figure 5:
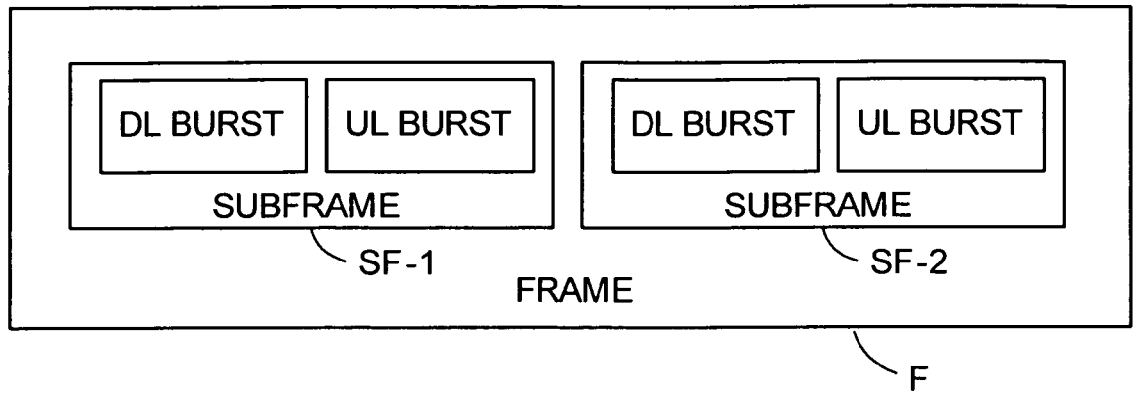
FIG. 5 is a diagrammatic view of a generic sub-framed frame structure for an example frame as communicated between a base station and a wireless terminal.
Figure 5A:
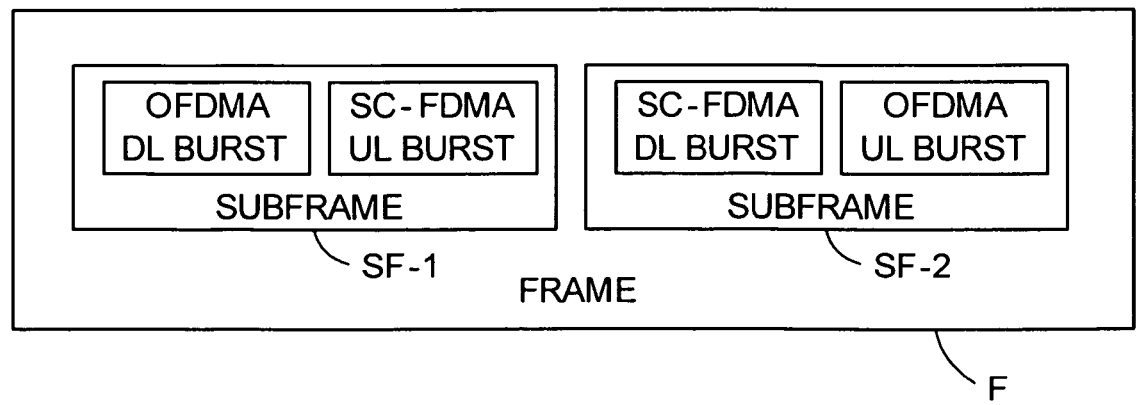
FIG. 5A is a diagrammatic view of a generic sub-framed frame structure for an example frame for the implementation of FIG. 4A wherein a first type of multiple access technology is or comprises orthogonal frequency division multiple access (OFDMA) and a second type of multiple access is or comprises single carrier frequency division multiple access (SC-FDMA).

In the various embodiments described herein, differing portions of a frame can be handled or processed (e.g., formatted or deformatted) with or according to differing multiple access technology types. As mentioned previously, "differing portions" of a frame encompasses (for example) differing subframes of a multi-sub-framed frame, differing bursts, differing burst fields or sections of a burst, differing zones. As such, in some contexts these terms may be used interchangeably. In some example embodiments, generically represented by FIG. 5, the frame handlers of the wireless terminals 30 are arranged to prepare the uplink portions of the frames F as plural subframes. In this sense, the frames F can be considered as a sub-framed frame. FIG. 5 shows frame F as comprising two subframes, in particularly subframe SF-1 and SF-2. It will be appreciated that more than two subframes can be provided in a frame. Further, in such example embodiments, each subframe can comprise a downlink (DL) portion or burst as well as an uplink (UL) portion or burst. FIG. 5 thus illustrates the use of differing multiple access technologies in differing bursts. In the FIG. 5 example embodiment, a multiple access technology uses a complete burst and thus has a TTG/RTG before and after its time portion (as understood, e.g., with reference to FIG. 7 hereinafter described). The FIG. 5 configuration can thus be utilized for TDD and HD-FDD (half duplex FDD) where the TTG/RTG exist. FIG. 5A shows an example employment of the sub-framed frame F of FIG. 5 in the context of the implementation of FIG. 4A wherein the first type of multiple access technology is or comprises orthogonal frequency division multiple access (OFDMA) and the second type of multiple access is or comprises single carrier frequency division multiple access (SC-FDMA).

Figure 6:
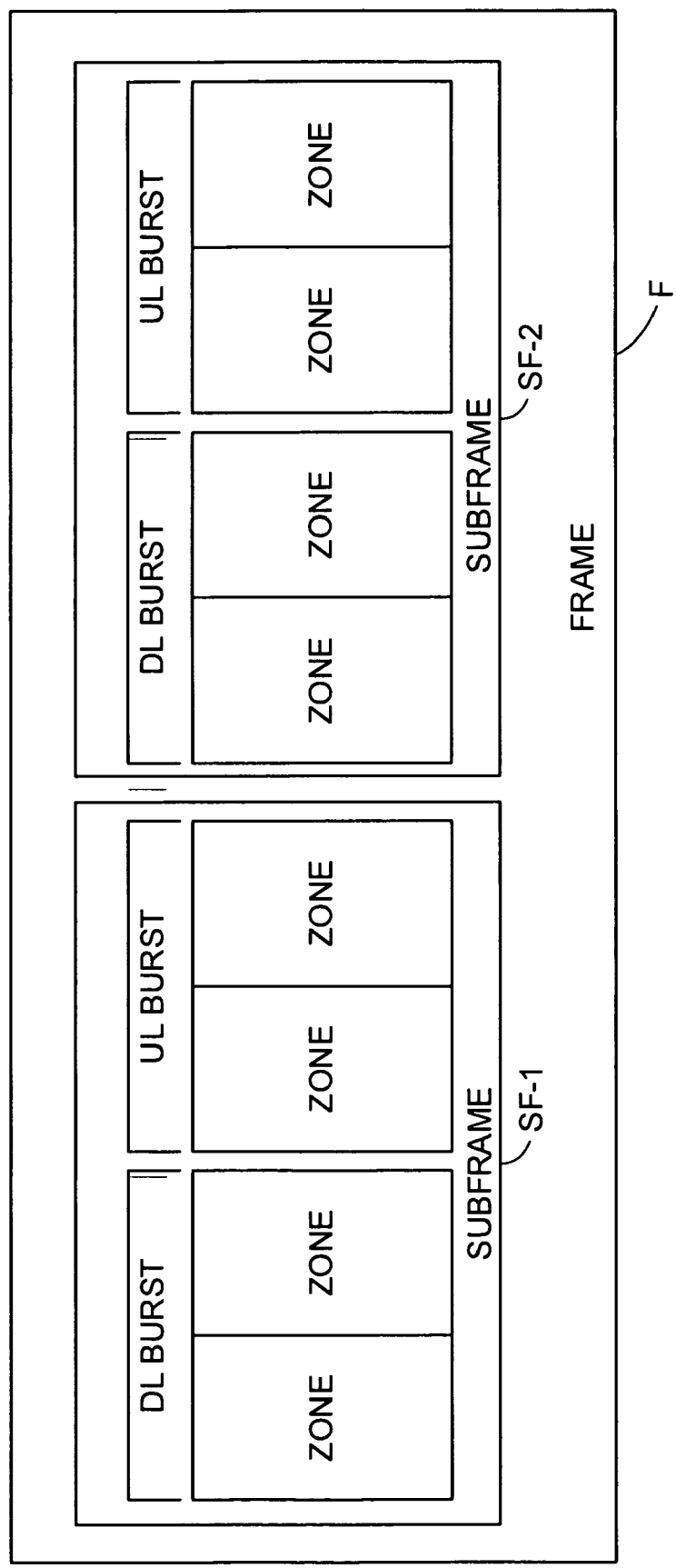
FIG. 6 is a diagrammatic view of a generic sub-framed and zoned frame structure for an example frame as communicated between a base station and a wireless terminal.

FIG. 6 illustrates that, in some implementations or embodiments, one or both of the downlink (DL) burst and the uplink (UL) bursts can comprise or be split into plural time sections or "zones", with differing time sections or zones being allocated to differing multiple access technology types. Zone-type configurations can be utilized for TDD, HD-FDD, and TDD.

Thus, in the FIG. 4A contextualized implementation of the generic sub-framed frame F of FIG. 5A, first type modulator 62 of base station 28-4A prepares the downlink (DL) burst of subframe SF-1 as an OFDMA burst (e.g., with OFDMA modulation). The downlink (DL) burst of subframe SF-1 can be received by wireless terminal (WT) 30-1-4A and processed by deformatter 54-1-4A. In addition, since wireless terminal (WT) 30-2-4A is capable of operating in a dual mode, the downlink (DL) burst of subframe SF-1 can be received by wireless terminal (WT) 30-2-4A and processed by deformatter 54-2-4A.

The uplink (UL) burst of subframe SF-1 is an SC-FDMA burst, and as such is generated by the wireless terminal capable of operating with SC-FDMA, i.e., wireless terminal (WT) 30-2-4A. The formatter 52 of wireless terminal (WT) 30-2-4A modulates information with SC-FDMA multiple access technology for inclusion in the uplink (UL) burst of subframe SF-1 for transmission in frame F-2 to base station 28-4A. At base station 28-4A the uplink (UL) burst of subframe SF-1 is processed by SC-FDMA demodulator 68.

The downlink (DL) burst of subframe SF-2 is prepared as an SC-FDMA burst by SC-FDMA modulator 64 and transmitted in frame F-2. The downlink (DL) burst of subframe SF-2 can be received by wireless terminal (WT) 30-2-4A, and is processed by SC-FDMA deformatter 54 of wireless terminal (WT) 30-2-4A.

The uplink (UL) burst of subframe SF-2 is an OFDMA burst, and as such can generated by wireless terminal (WT) 30-1-4A or wireless terminal (WT) 30-2-4A (since wireless terminal (WT) 30-2-4A has dual multiple access technology capability). The formatter 52 of the respective wireless terminal (WT) 30 modulates information with OFDMA multiple access technology for inclusion in the uplink (UL) burst of subframe SF-2 for transmission in respective frame F-1-4A or frame F-2-4A to base station 28-4A. At base station 28-4A the uplink (UL) burst of subframe SF-2 is processed by OFDMA demodulator 66.

The foregoing describes the generation and handling of the frame (both on the downlink and uplink) in the context of operation of the embodiment of FIG. 4A. Operation of the embodiment of FIG. 2 (in which the content of the frame has different multiple access technologies on the uplink-only) and the embodiment of FIG. 3 (in which the content of the frame has different multiple access technologies on the downlink-only) are both understood from the preceding discussion of the embodiment of FIG. 4A, since the embodiment of FIG. 4A utilizes different multiple access technologies both on the uplink and the downlink for the frame. Moreover, from FIG. 4A the person skilled in the art will also understand how systems can operate in access technologies (modulation technologies) which are different from the OFDMA and SC-FDMA technologies which happen to be illustrated in FIG. 4A.

Figure 7:
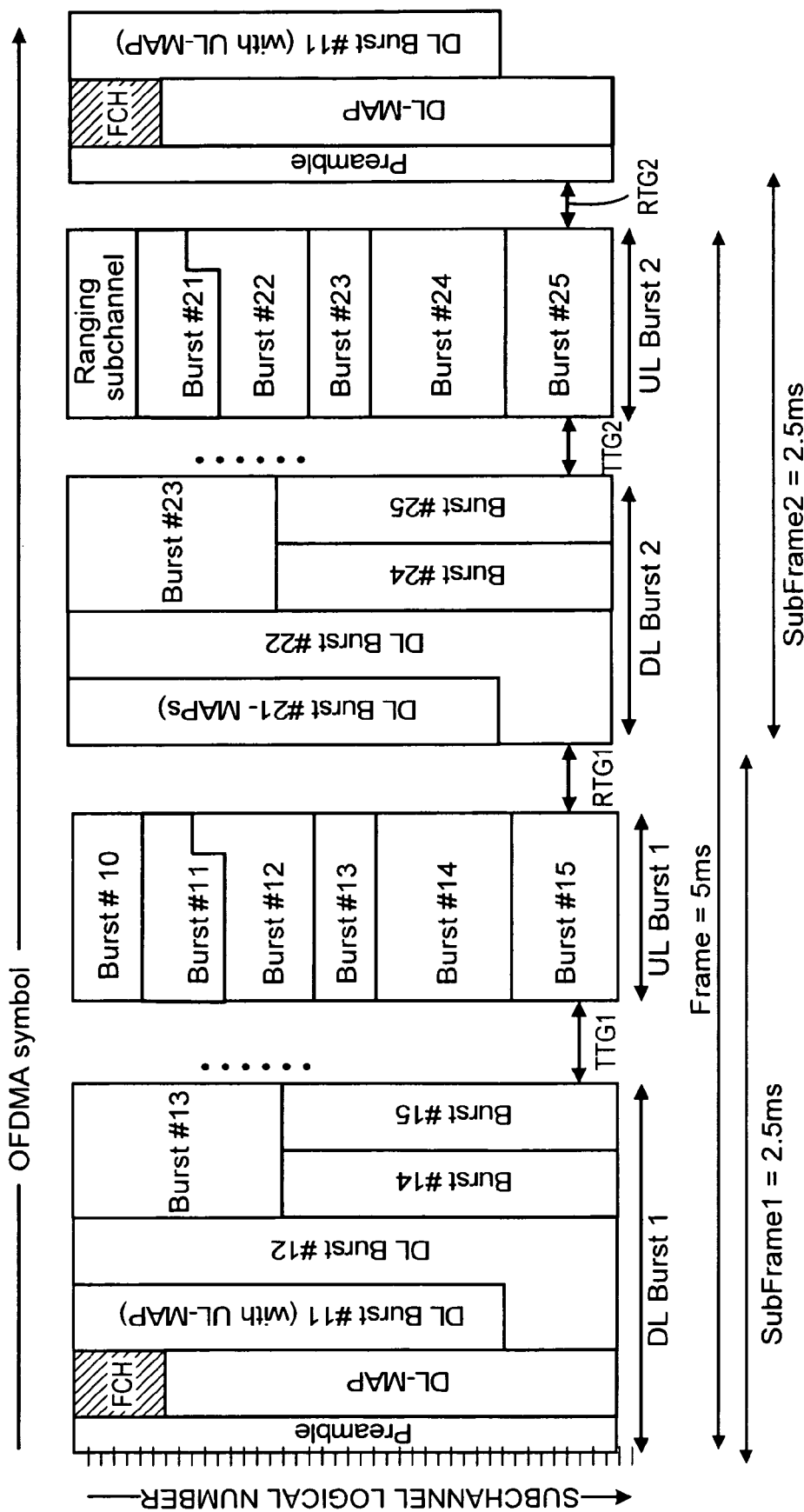
FIG. 7 is a diagrammatic view of a more specific sub-framed frame structure for an example frame as communicated between a base station and a wireless terminal.

While FIG. 5 shows generic structure for a sub-framed frame, FIG. 7 shows an example frame structure which is consistent with and particularly but not exclusively suited for IEEE standard 802.16m.

The five ms frame of FIG. 7 is divided into two 2.5 ms subframes for the purposes of illustration. In similar manner with the generic depiction of FIG. 5, each subframe comprises a downlink (DL) portion and an uplink (UL) portion, e.g., downlink (DL) Burst 1 and uplink (UL) Burst 1 in subframe 1 and downlink (DL) Burst 2 and uplink (UL) Burst 2 in subframe 2. More particularly, each 5 ms frame comprises four consecutive burst: downlink (DL) burst 1; uplink (UL) burst 1; DL burst 2; UL burst 2. The two subframes need not be equal. The lengths of the subframes could be configured so that one subframe is longer than the other, though the lengths of both subframes, along with the transmit and receive transition gaps added, sum to 5 ms.

As explained below and in U.S. Provisional Patent Application 60/986,062, entitled "Backwards Compatible Implementation of SC-FDMA Uplink in WiMAX", filed Nov. 7, 2007, backward compatibility can be achieved by scheduling data to/from legacy terminals only in DL burst 1 and UL burst 2, thus making the existence of UL burst 1 and DL burst 2 invisible to legacy terminals. The technology makes further use of this invisibility of UL burst 1 and DL burst 2 to legacy terminals by introducing SC-FDMA in UL burst 2. The technology can be generalized to the introduction of a general change to UL burst 1 and/or DL burst 2, rendered backwards compatible through the invisibility of these bursts to the legacy terminals.

As shown in FIG. 7, the bursts of enhanced frame F are separated by gaps to allow for switching the transceiver from transmit to receive. For example, FIG. 7 illustrates a first transmit transition gap (TTG1) between downlink (DL) Burst 1 of subframe 1 and uplink (UL) Burst 1 of subframe 1; a first receive transition gap (RTG1) between uplink (UL) Burst 1 of subframe 1 and downlink (DL) burst 2 of subframe 2; a second transmit transition gap (TTG2) between downlink (DL) Burst 2 of subframe 2 and uplink (UL) Burst 2 of subframe 2; and a second receive transition gap (RTG2) between uplink (UL) Burst 2 of subframe 2 and a downlink (DL) burst 1 of the first subframe of a next frame. The presence of the RTGs helps prevent uplink (UL) interference from downlink (DL) transmissions from remote base stations.

FIG. 7 further shows that a preamble need not necessarily be present in the downlink (DL) part of subframe 2. Nor is the ranging subchannel present in the uplink (UL) part of subframe 1. These functionalities are present in downlink (DL) Burst 1 and uplink (UL) Burst 2, and need not be repeated in downlink (DL) Burst2 and uplink (UL) Burst 1, but can be optionally included.

Figure 8:
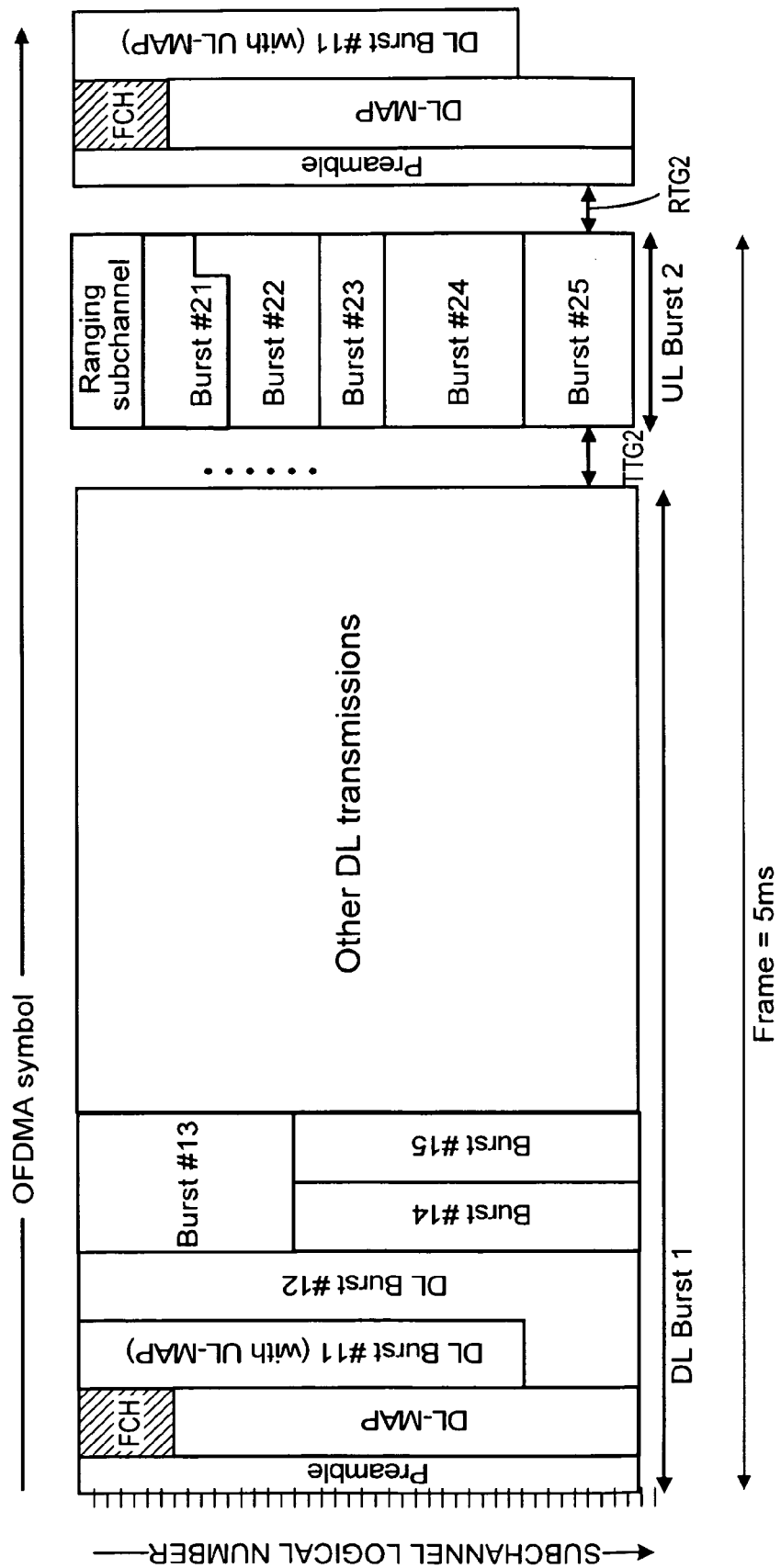
FIG. 8 is a diagrammatic view of how the frame structure of FIG. 7 appears to a wireless terminal (WT) capable of operating in accordance with only a first multiple access technology.

FIG. 8 shows how the frame structure of FIG. 7 appears to a wireless terminal (WT) of the first type, e.g., to a legacy wireless terminal. The part of the frame between downlink (DL) Burst 1 and uplink (UL) Burst 2 will not be assigned to any legacy wireless terminals, and will appear as other downlink (DL) transmissions. Optionally, the wireless terminal 30 of the first type may be assigned allocations in both DL Burst 1 and DL Burst 2 but not in the part of the frame used for UL Burst 1. Typically, these may be seen as downlink (DL) transmissions using a zone that is not supported by the wireless terminals. Support for multiple zones exists in IEEE standard 802.16e.

Thus, as seen from the foregoing, in some embodiments frame handler 50 of an enhanced wireless terminal, e.g., wireless terminal (WT) 30-2-4, is arranged with a capability of preparing differing ones of the plural subframes (e.g., SF-1 and SF-2) as being formatted according to the respective differing multiple access technologies, e.g., the uplink (UL) burst of subframe SF-1 in accordance with SC-FDMA and the uplink (UL) burst of subframe SF-2 in accordance with OFDMA in the FIG. 4A example context. In other words, the frame handler 54 of wireless terminal (WT) 30-2-4A is arranged to prepare one subframe of the frame according to a first type of multiple access technology and to prepare another subframe of the frame according to a second type of multiple access technology. The frame handler of the wireless terminal 30-2-4A is arranged to prepare the frame whereby a first uplink burst of a first subframe (e.g., subframe SF-1) is modulated according to the second type of multiple access technology (e.g., SC-FDMA) and whereby a second uplink burst of a second subframe (e.g., subframe SF-2) is modulated according to the first type of multiple access technology (e.g., OFDMA). In the example implementation, transmission of the first uplink burst of the first subframe (e.g., subframe SF-1) precedes in time transmission of the second uplink burst of the second subframe (e.g., subframe SF-2).

Figure 4B:
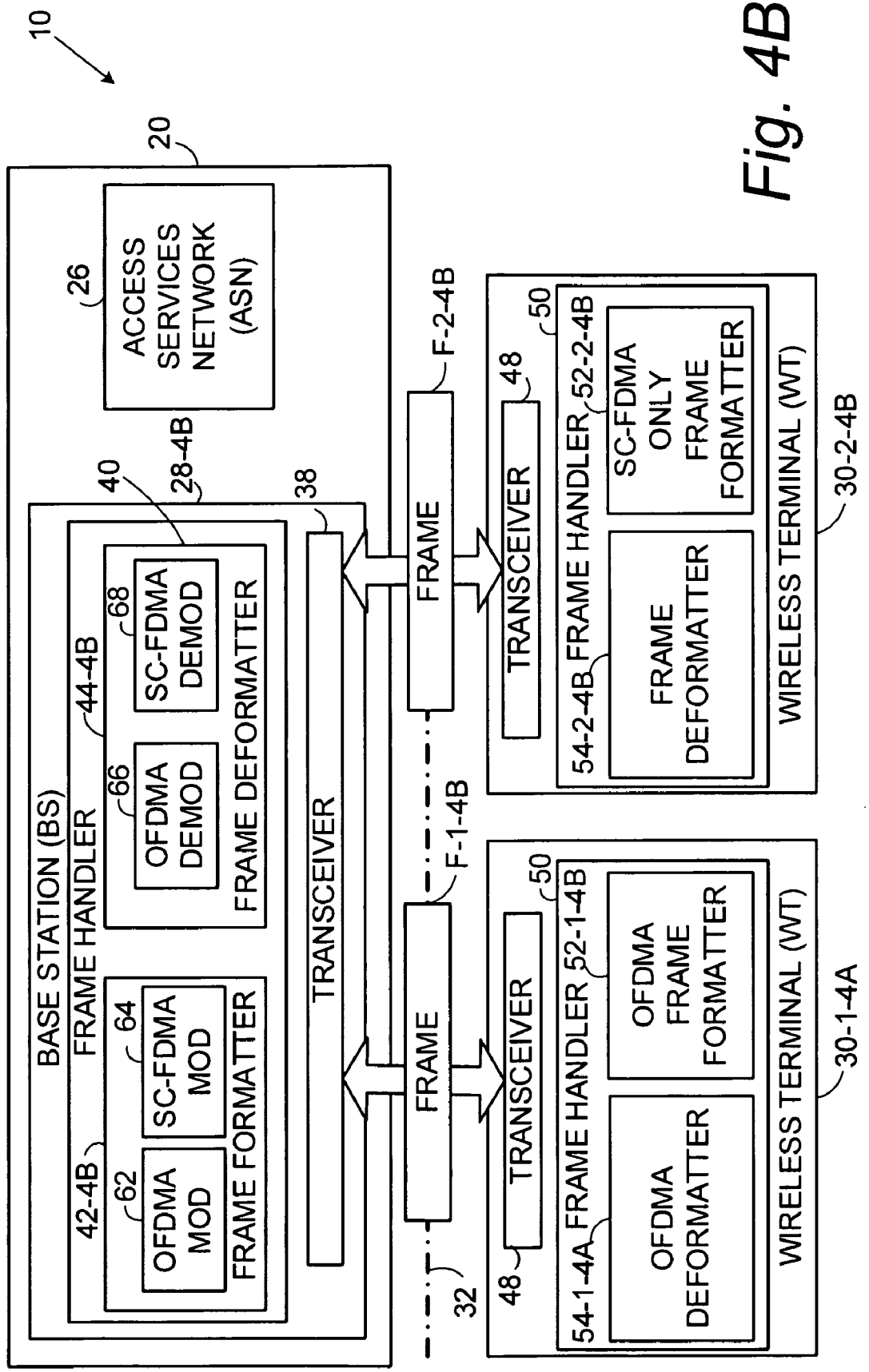
FIG. 4B is a schematic view of an example implementation of the telecommunications system of the embodiment of FIG. 4 wherein a first type of multiple access technology is or comprises orthogonal frequency division multiple access (OFDMA) and a second type of multiple access is or comprises single carrier frequency division multiple access (SC-FDMA), and wherein a second type wireless terminal has only single carrier frequency division multiple access (SC-FDMA) capability.

FIG. 4B shows another example implementation of the telecommunications system of the embodiment of FIG. 4, wherein the first type of multiple access technology is or comprises orthogonal frequency division multiple access (OFDMA) and the second type of multiple access is or comprises single carrier frequency division multiple access (SC-FDMA). In contrast to the FIG. 4A implementation, however, FIG. 4B shows second type wireless terminal as having only single carrier frequency division multiple access (SC-FDMA) capability on the uplink (UL). In other words, frame formatter 52-2-4B is capable of preparing uplink (UL) bursts of the frames only using a single multiple access technology, e.g., the enhanced multiple access technology which (in the FIG. 5A example context) is SC-FDMA.

Thus, base station 28-4B is capable of serving several different types of wireless terminals (WT). In addition to legacy terminals such as wireless terminal (WT) 30-1-4B supporting OFDMA only in the uplink (UL), two classes of new terminals (e.g., wireless terminal (WT) 30-2) may be provided: (A) Class A terminals, such as that illustrated by wireless terminal (WT) 30-2-4A of FIG. 4A, which support both SC-FDMA and OFDMA in the uplink; and (B) Class B terminals, such as that illustrated by wireless terminal (WT) 30-2-4B of FIG. 4B, which support only SC-FDMA in the uplink.

Terminal capabilities of the wireless terminals are signalled to the network, e.g., to the base station. Upon receipt by the base station of capability information, Class A terminals (such as wireless terminal (WT) 30-2-4A of FIG. 4A) may be scheduled to transmit both in UL burst 1 and in UL burst 2. On the other hand, Class B terminals (such as wireless terminal (WT) 30-2-4B of FIG. 4B) may be scheduled to transmit only in UL burst 1. Class B terminals are less complex than class A terminals, but at a cost or tradeoff of not being able to receive services from a legacy base station and of reduced peak data rate in a system where a portion of the frame is non-dynamically allocated for multiple access technology 1.

Figure 4C:
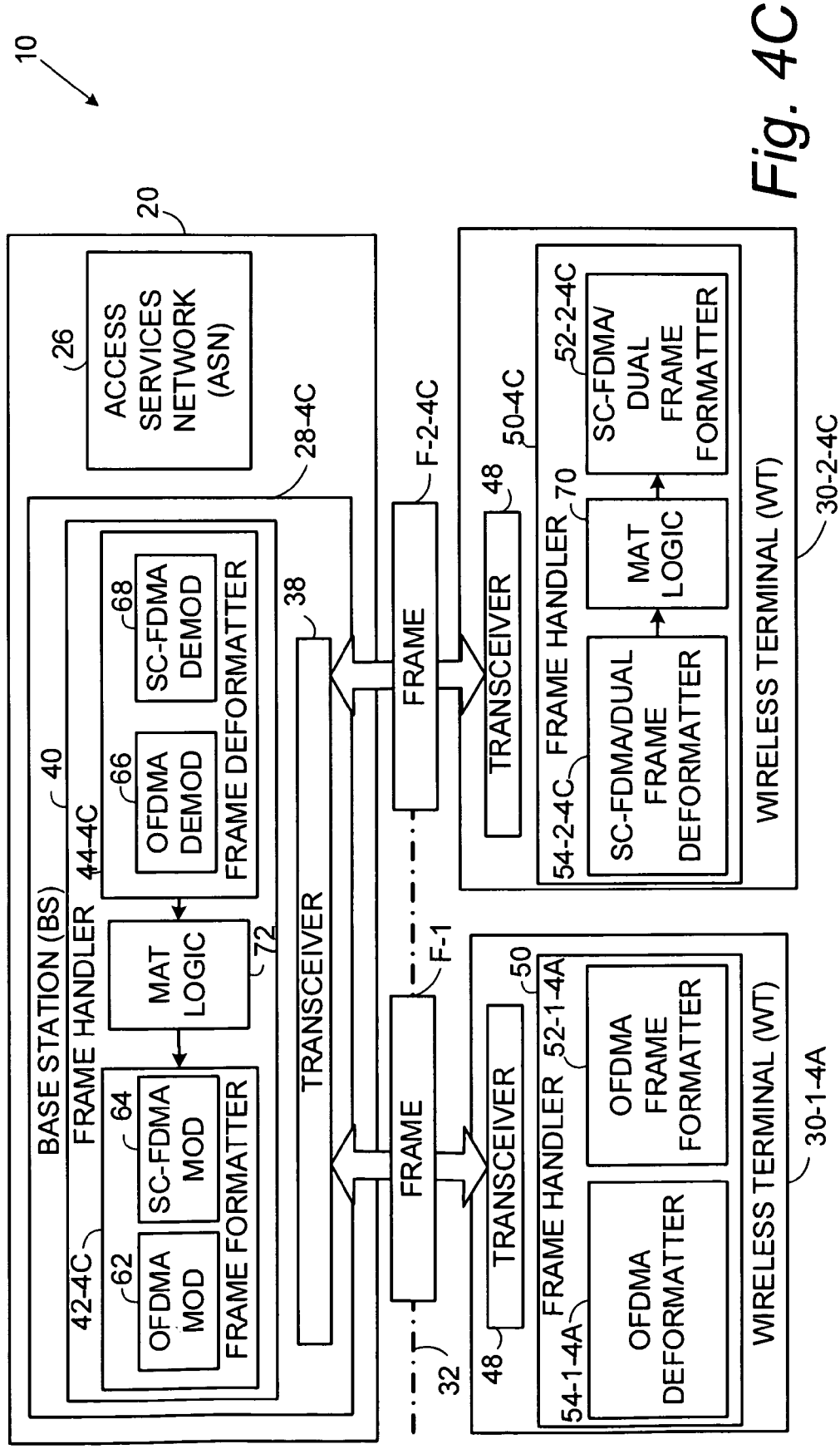
FIG. 4C is a schematic view of an example implementation of the telecommunications system of the embodiment of FIG. 4 in which a second multiple access technology can selectively be used in more than one multiple access technology-apportioned portion of a frame.

FIG. 4C shows yet a further example implementation, and particularly an implementation in which the second multiple access technology can selectively be used in more than one uplink (UL) portion of a frame. In the FIG. 4C implementation, frame handler 50-4C of wireless terminal (WT) 30-2-4C is arranged to dynamically determine whether to prepare at least one subframe of the frame according to a first multiple access technology or a second multiple access technology. In particular, wireless frame handler 50-4C of wireless terminal (WT) 30-2-4C comprises multiple access technology logic, e.g., MAT logic 70 which dynamically determines, based on content of a downlink burst of the frame, whether to prepare at least one subframe of the frame according to a first multiple access technology or a second multiple access technology. For example, frame handler 50-4C of wireless terminal (WT) 30-2-4C can prepare an uplink burst of a first subframe (e.g., subframe SF-1) according to the second multiple access technology and then dynamically determine (based on content of a downlink burst of the frame) whether to prepare an uplink burst of a second subframe (e.g., subframe SF-2) according to either the first multiple access technology or the second multiple access technology.

In the example implementation of FIG. 4C, the frame handler 40 of base station 28-4C also includes means for preparing appropriate content of the downlink (DL) burst to apprise wireless terminal (WT) 30-2-4C whether a certain uplink (UL) burst of a frame (e.g., a next or ensuing frame) is to be prepared according to the first multiple access technology or according to the second multiple access technology. To this end, the frame handler base station 28-4C comprises MAT logic 72 which directs the frame formatter in the preparation of the downlink (DL) bursts, and particularly to include therein content (e.g., a message or signal) regarding the appropriate multiple access technology to be used in a selected uplink (UL) burst, such as Uplink Burst 2 of subframe SF-2, for example.

Figure 9:
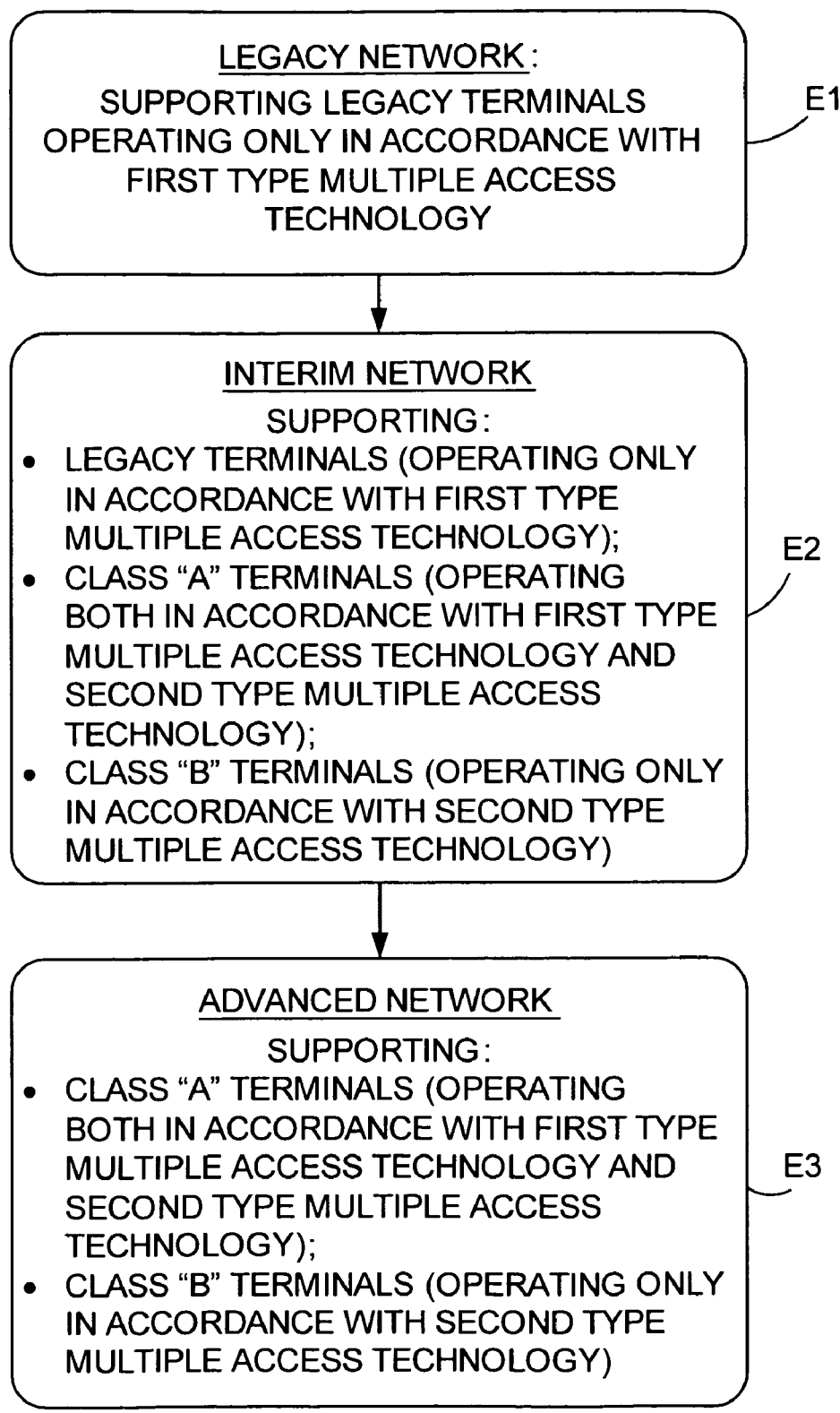
FIG. 9 is a diagrammatic view showing an evolution or sequence of network development epochs facilitated by the present technology.

Thus, the foregoing implementations allow for an evolution or phased-in introduction/conversion to the second type multiple access technology. As illustrated by FIG. 9, such evolution or conversion comprises the following aspects or epochs (each denoted as "E"):

(E1) a legacy network supporting legacy terminals (and new terminals with legacy support) only.

(E2) an interim network using OFDMA in UL Burst 2 and SC-FDMA in UL Burst 1, which epoch supports legacy terminals (such as wireless terminal (WT) 30-1), Class A terminals (e.g., wireless terminal (WT) 30-2-4A of FIG. 4A), and Class B terminals (e.g., wireless terminal (WT) 30-2-4B of FIG. 4B).

(E3) a SC-FDMA only network, supporting Class A and B terminals, but not supporting legacy terminals (such as wireless terminal (WT) 30-1).

In the interim network, legacy terminals (such as, e.g., wireless terminal (WT) 30-1) are only scheduled to transmit in UL burst 2, and Class B terminals are only scheduled to transmit in UL burst 1, while Class A terminals may be scheduled to transmit both in UL burst 1 and UL burst 2. The final third step in the network evolution may be introduced when legacy terminals have been phased out.

As yet another further development of the technology the use of OFDMA or SC-FDMA in UL burst 2 can be switched dynamically on for the 5 ms frame basis based on signalling in DL burst 1, as exemplified by wireless terminal (WT) 30-2-4C of FIG. 4C. In a frame where SC-FDMA is entirely used, legacy terminals can not be scheduled for transmission. In a frame where OFDMA is used class B terminals can not be scheduled for transmission in UL burst 2.

As explained above, some example embodiments and implementations apportion a frame according to subframes, and accord differing multiple access technologies to differing subframes of the frame. In other example embodiments and implementations, the uplink (UL) portion or uplink (UL) burst of a frame is apportioned or divided into plural burst fields or plural burst sections. The frame handler of the wireless terminal is arranged to prepare differing ones of the plural burst fields as being formatted according to the respective differing multiple access technologies. In an example implementation, the frame comprises a downlink burst, and the frame handler of the wireless terminal is arranged to determine from the downlink burst at least one of the plural burst fields as belonging to a first multiple access technology and at least one of the plural burst fields as belong to the second multiple access technology.

Figure 10:
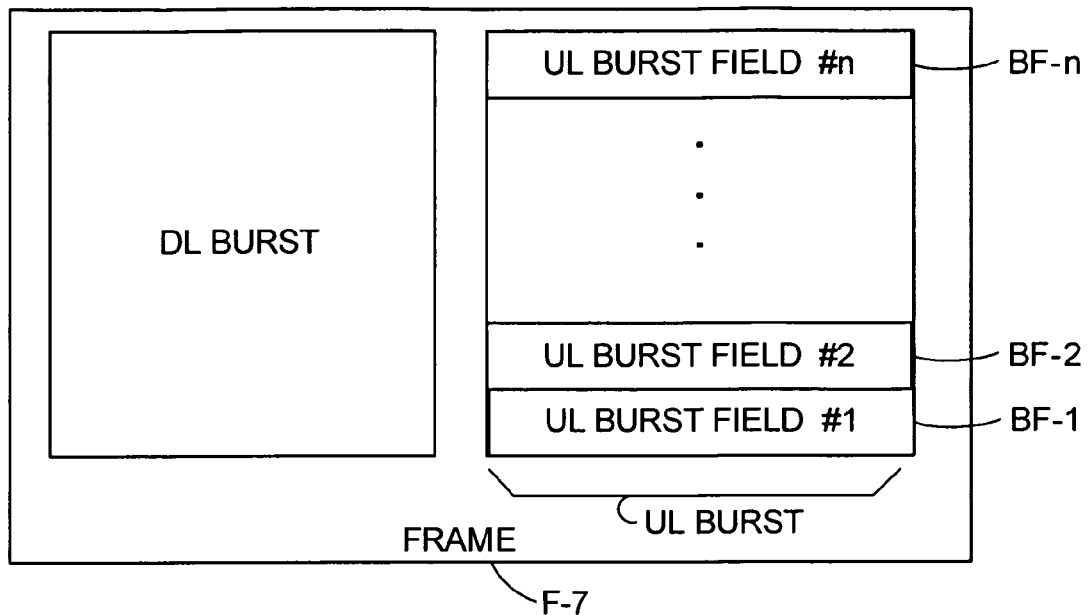
FIG. 10 is a diagrammatic view of a generic burst field-apportioned frame structure.
Figure 11:
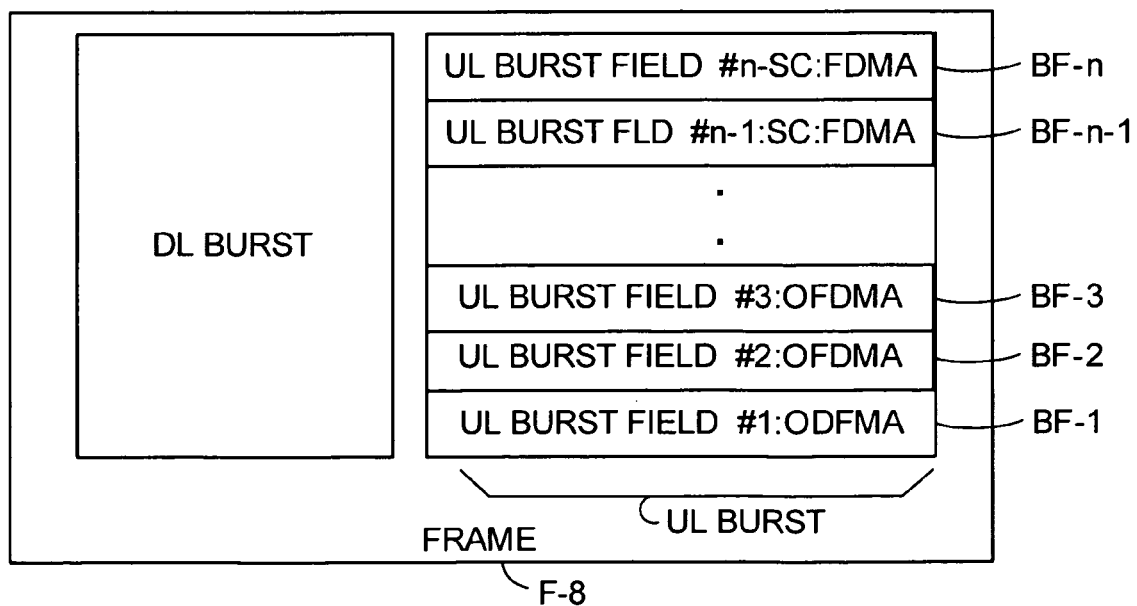
FIG. 11 is a diagrammatic view of showing multiple access technology apportionment of a burst field-apportioned frame structure such as that of FIG. 10.

FIG. 10 shows a generic frame F-8 which, although not necessarily being divided into subframes, has its UL burst divided or partitioned into plural burst fields or plural burst sections, such as burst field BF-1, burst field BF-2, . . . , burst field BF-n. FIG. 11 shows a specific example wherein frame F-9 has its UL burst divided or partitioned into burst fields BF-1 through BF-n, and further shows an apportioning of multiple access technologies to different ones of the plural burst fields. In particular, FIG. 11 shows that at least burst fields BF-1 through BF-3 are allocated for first type multiple access technology (e.g., OFDMA), and that at least burst fields BF-n–1 through BF-n are allocated for second type multiple access technology (e.g., SC-FDMA).

Figure 1:
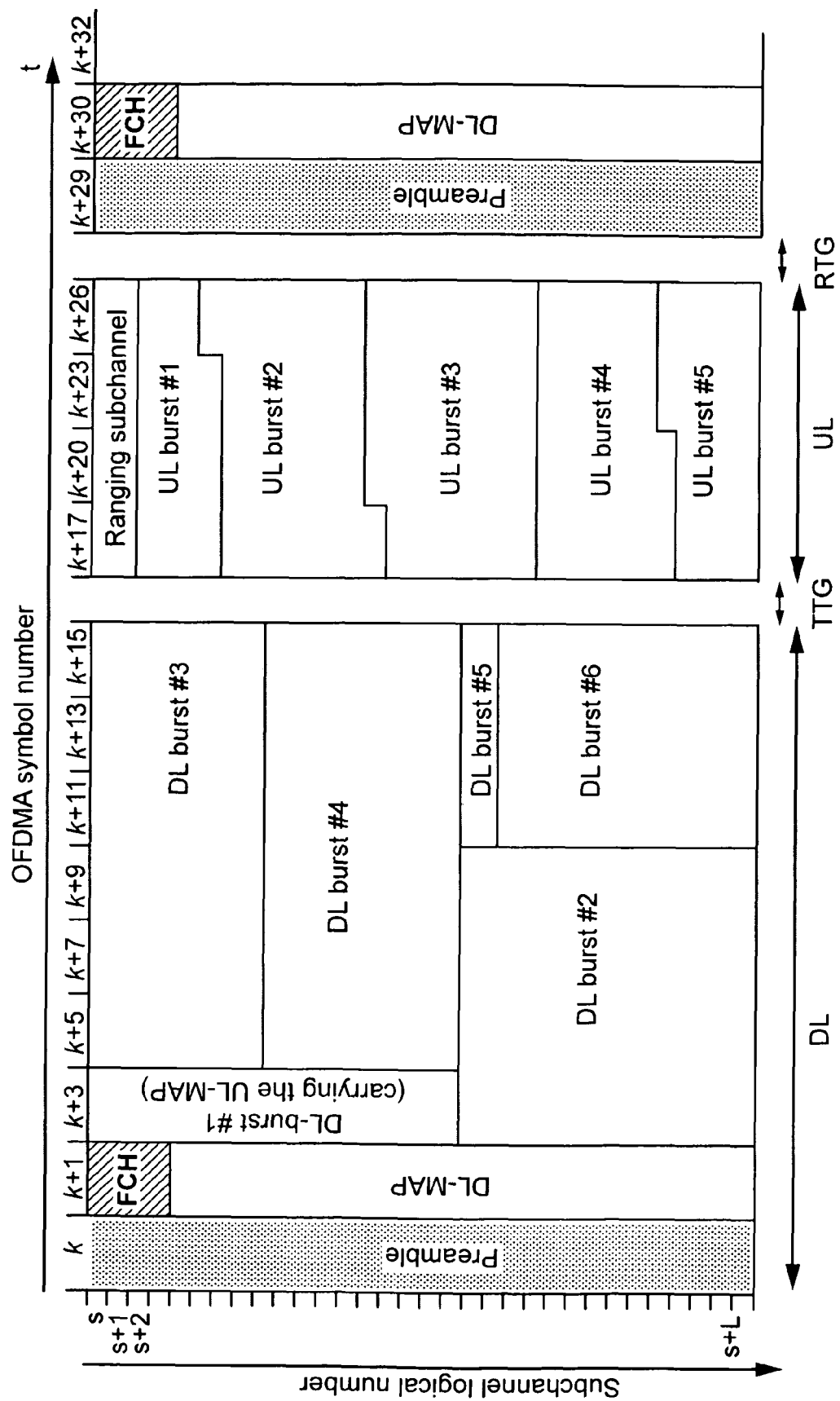
FIG. 1 is a diagrammatic view of frame structure for IEEE standard 802.16e.

Of course, a more complex frame structure than the generic depiction of FIG. 10 can be provided. One example deployment termed as Reference IEEE Wireless MAN OFDMA System, and based on a subset of the IEEE 802.16e standard is shown in FIG. 1. The frame structure for IEEE standard 802.16e as shown in FIG. 1, being 5 ms in length and using time division multiplexing (TDD), has frame units comparable to the burst fields of FIG. 10 and can accordingly be similarly utilized. In such situation, the frame structure of Reference IEEE WirelessMAN-OFDMA is not changed.

Thus, in the burst field type example embodiments, a single uplink burst is divided in time into two or more uplink burst sections, where one of SC-FDMA and OFDMA is used for each uplink burst section. Legacy terminals can be scheduled to transmit only in uplink burst sections using OFDMA, but enhanced or upgraded terminals can use a second type of multiple access technology (e.g., SC-FDMA) in other uplink (UL) burst fields.

It should be readily understood that the example implementations described herein, including but not limited to the example implementations of FIG. 2, FIG. 3, FIG. 4, FIG. 4A, FIG. 4B, and FIG. 4C, are applicable to any technique for apportioning plural multiple access technologies to a frame, e.g., to an uplink (UL). As such, the example implementations of FIG. 2, FIG. 3, FIG. 4, FIG. 4A, FIG. 4B, and FIG. 4C encompass not only apportioning the multiple access technologies according to sub-frames, but also apportionment according to burst fields BF or comparable frame units in the example manner of FIG. 10 and FIG. 11. In other words, a frame such as frame F-2 as herein illustrated can have information modulated according to differing types of multiple access technologies apportioned either on a subframe basis or on a burst field basis.

Reiterating the foregoing, the frame formatters 52 of the various embodiments of wireless terminals (WT) 30-2 can apportion information modulated according to differing multiple access technologies to differing subframes (in the general manner depicted, e.g., by FIG. 5 and/or FIG. 5A) or to differing burst fields (in the general manner depicted, e.g., by FIG. 9 and/or FIG. 10). For example:

A frame formatter of a wireless terminal such as wireless terminal (WT) 30-2-4A can apportion information modulated according to differing multiple access technologies to differing subframes in the general manner depicted, e.g., by FIG. 5 and/or FIG. 5A, or can apportion information modulated according to differing multiple access technologies to differing burst fields in the general manner depicted, e.g., by FIG. 9 and/or FIG. 10.

frame formatter 52-2B of a wireless terminal such as wireless terminal (WT) 30-2-4B can modulate information according to the second type of multiple access technology for those uplink (UL) bursts, or burst fields of the uplink (UL) burst, for which modulation by the second type of multiple access technology, but not for any uplink (UL) bursts, or burst fields of the uplink (UL) burst, which are reserved for the first type multiple access technology.

frame formatter 52-2C of a wireless terminal such as wireless terminal (WT) 30-2-4C can selectively apportion, e.g., on the fly, information modulated according to differing multiple access technologies to differing subframes or burst field BFs of an uplink (UL) burst.

Thus, as different embodiments or implementations of the technology, the division in time of the uplink burst into uplink burst sections and the choice of multiple access technology type (e.g., SC-FDMA and OFDM) in each uplink burst section can be either: (1) fixed; (2) changeable on a frame to frame basis, based on signalling in the downlink burst; or, (3) changeable on a longer time scale, based on system information signalling (and if needed a network upgrade).

Thus, in like manner with the subframe-type apportionment of multiple access technologies, using a frame which comprises burst fields potentially apportioned to differing multiple access technologies can support several different types of wireless terminals. In addition to legacy terminals such as wireless terminal (WT) 30-1 supporting OFDMA only in the uplink (UL), two classes of new terminals (e.g., wireless terminal (WT) 30-2) may be provided: (A) Class A terminals, such as that illustrated by wireless terminal (WT) 30-2-4A of FIG. 4A, which support both SC-FDMA and OFDMA in the uplink; and (B) Class B terminals, such as that illustrated by wireless terminal (WT) 30-2-4B of FIG. 4B, which support only SC-FDMA in the uplink. Class A terminals can be scheduled to transmit in any uplink burst field or section, while Class B terminals may be scheduled to transmit only in uplink burst fields or sections using SC-FDMA, and legacy terminals may be scheduled to transmit only in uplink burst fields or sections using OFDMA.

In example embodiments in which the division in time of the uplink burst into uplink burst fields or sections and the choice of multiple access technology (e.g., SC-FDMA and OFDM) in each uplink burst field or section is changeable in time, the same network evolution as depicted in FIG. 9 is feasible.

Figure 12:
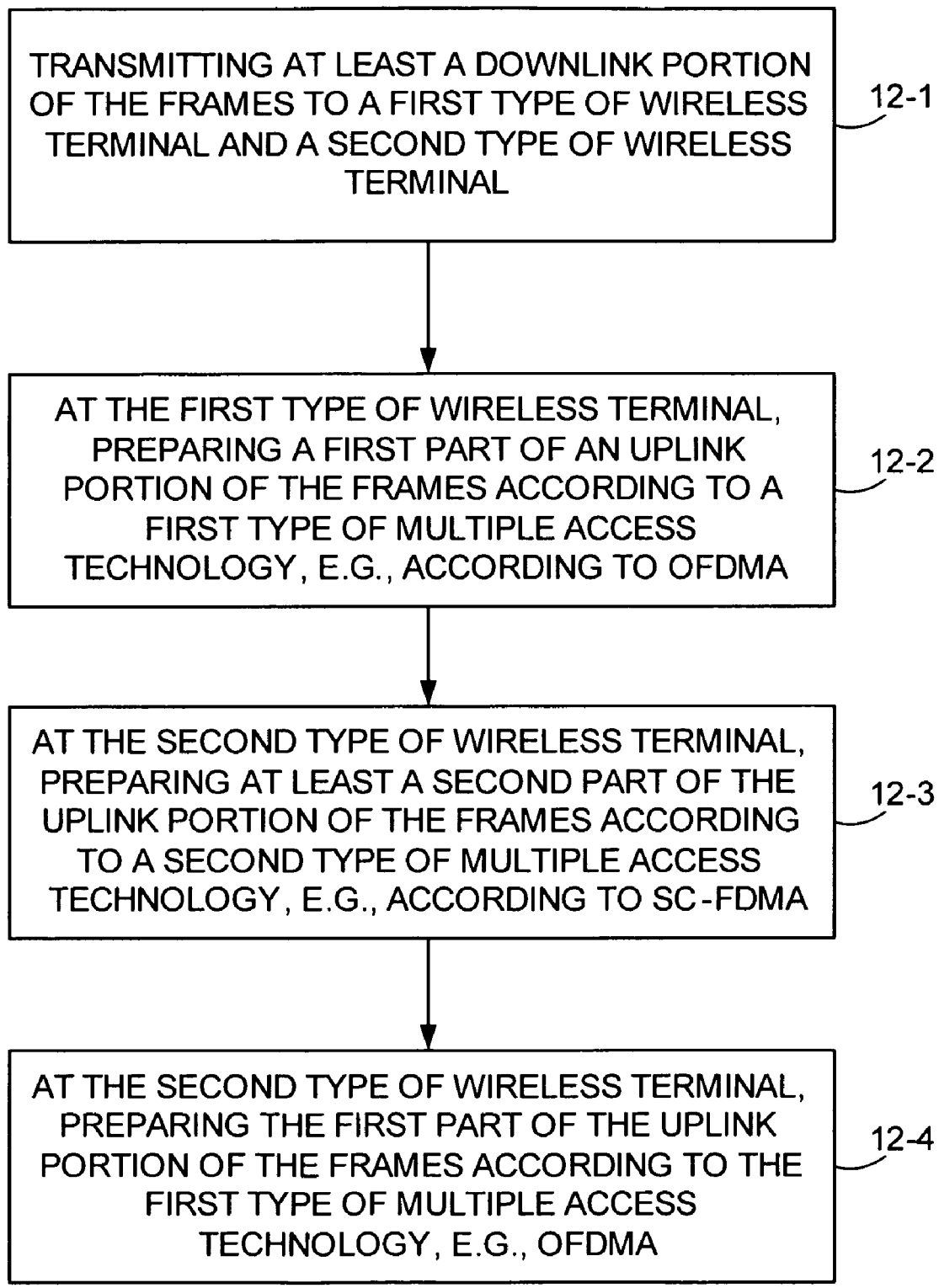
FIG. 12 is a flowchart showing example, representative, non-limiting basic acts or steps comprising a method of operating a radio access network which communicates over radio interface with plural types of wireless terminals using frames of information.

FIG. 12 illustrates example, representative, non-limiting basic acts or steps comprising a method of operating a radio access network (comprising a base station such as base station 28) which communicates over radio interface 32 with plural types of wireless terminals using frames of information.

Act 12-1 comprises transmitting at least a downlink portion of the frames to a first type of wireless terminal and a second type of wireless terminal. As indicated above, the first type of wireless terminal can be represented by wireless terminal (WT) 30-1 and the second type of wireless terminal can be represented by any one of the wireless terminals (WT) 30-2 (see FIG. 2, FIG. 3, FIG. 4, FIG. 4A, FIG. 4B, and FIG. 4C).

Act 12-2 comprises, at the first type of wireless terminal, preparing a first part of an uplink portion of the frames according to a first type of multiple access technology, e.g., according to OFDMA, for example. Act 12-2 can be performed when the radio access network is no more advanced than the interim network depicted as E2 in FIG. 9.

Act 12-3 comprises, at the second type of wireless terminal (e.g., one of the wireless terminals (WT) 30-2 described herein), preparing at least a second part of the uplink portion of the frames according to a second type of multiple access technology, e.g., according to SC-FDMA, for example. The second part of the uplink portion of the frames can be an uplink (UL) portion of one of plural subframes of the frame (in the manner understood with reference to FIG. 5 or FIG. 5A), or one or more burst fields of an uplink (UL) burst (in the manner understood with reference to FIG. 10 or FIG. 11). If the second type of wireless terminal is a type such as wireless terminal (WT) 30-2B of FIG. 4B which is capable only of operating with the second type multiple access technology, then only those subframes or burst fields allocated to the second type multiple access technology can be utilized by the wireless terminal (WT) 30-2B.

Act 12-4 can be undertaken when the second type of wireless terminal has a dual multiple access technology capability, e.g., when the second type of wireless terminal is of a type such as wireless terminal (WT) 30-2-4A of FIG. 4A. Act 10-4 comprises, at the second type of wireless terminal, preparing the first part of the uplink portion of the frames according to the first type of multiple access technology.

As understood from the foregoing, in an example mode the method further comprises the wireless terminal preparing the frames as plural subframes, with differing ones of the plural subframes being formatted according to the respective differing multiple access technologies. For example, the wireless terminal can prepare one subframe of the frames according to a first type of multiple access technology and to prepare another subframe of the frames according to a second type of multiple access technology. In an example implementation, the first type of multiple access technology is orthogonal frequency division multiple access (OFDMA) and the second type of multiple access is single carrier frequency division multiple access (SC-FDMA).

An example mode further comprises the base station processing the frame regardless of whether the wireless terminal is a first type of wireless terminal capable of utilizing the first type of multiple access technology or whether the wireless terminal is a second type of wireless terminal capable of utilizing both the first type of multiple access technology and a second type of multiple access technology. Each subframe comprises a downlink burst followed by an uplink burst, the base station processing the frame whereby a first uplink burst of a first subframe is demodulated according to the second type of multiple access technology if the wireless terminal is the second type of wireless terminal and whereby a second uplink burst of a second subframe is demodulated according to the first type of multiple access technology.

In another example mode, the method further comprises the wireless terminal dynamically determining (in accordance with content of a downlink burst of a specific frame) whether to prepare at least one subframe of the specific frame according to a first multiple access technology or a second multiple access technology. In an example implementation, the wireless terminal prepares an uplink burst of a first subframe according to the second multiple access technology and dynamically determines whether to prepare an uplink burst of a second subframe according to either the first multiple access technology or the second multiple access technology.

In another example mode, depicted, e.g., by FIG. 10 and FIG. 11, the method further comprises formatting the frame to comprise an uplink burst comprising plural burst fields; and, preparing differing ones of the plural burst fields as being formatted according to the respective differing multiple access technologies. An example implementation of this mode further comprises including a downlink burst in the frames; and designating in the downlink burst at least one of the plural burst fields as belonging to the first multiple access technology and at least one of the plural burst fields as belong to the second multiple access technology It should readily be understood that the technology as described herein may be generalized as a way to introduce a general uplink technology X in a backwards compatible manner, by simply replacing SC-FDMA with technology X, everywhere in the text above and in the accompanying figures. As an example X may be some variant of SC-FDMA given a new name, or some version of OFDMA devised to reduce the PAPR. Such generalization is suitable regardless of how the frame structure is apportioned for the plural multiple access technologies, e.g., either by the sub-frame frame structure of the burst field-apportioned frame structure, as non-exhaustive examples. All embodiments and variations of the technology may be generalized also to other technologies than IEEE WirelessMAN-OFDMA, as a way to change the radio access technology in a backwards compatible manner.

The technology thus encompasses, by way of non-limiting example:

- A method by which an airlink frame is divided into two parts for uplink transmission, wherein OFDMA is used for transmission by a wireless terminal (WT) on the first part, and SC-FDMA is used for transmission by the wireless terminal (WT) on the second part.
- A system in which the uplink transmission frame is divided into two portions, wherein OFDMA is used on one portion and SC-FDMA is used on another portion.
- A base station that assigns resources to legacy wireless terminals (WT) so that they transmit on the portion where OFDMA is used, and assigns resources to new wireless terminals (WT) so that they transmit on the portion where SC-FDMA is used.
- A method for network operation by which a network is evolved from a legacy network supporting only OFDMA in the uplink, via a network supporting both OFDMA and SC-FDMA in the uplink, into a network supporting only SC-FDMA in the uplink, allowing time for phasing out of legacy terminals.

Advantages of the technology include but are not limited to the following:

Reduced PAPR and thus reduced requirements on the terminal amplifier.

Backwards compatible introduction of new radio access technology (SC-FDMA).

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station of a radio access network comprising:
    a transceiver configured for communicating a frame of information over an air interface with a wireless terminal participating in a connection with the base station;
    a frame handler arranged to process the frame as plural subframes, each subframe comprising at least one downlink burst and at least one uplink burst, each burst of the frame being separated from a succeeding burst by a transition gap, the frame handler being arranged to process at least one of the downlink bursts of the frame and at least one of the uplink bursts of the frame according to a first type of multiple access technology and to process at least one other downlink burst of the frame and at least one other uplink burst of the frame according to a second type of multiple access technology, wherein the first type of multiple access technology is orthogonal frequency division multiple access (OFDMA) technology and the second type of multiple access technology is single carrier frequency division multiple access (SC-FDMA) technology,
    wherein the frame comprises two subframes:
        a first burst of a first subframe being a downlink burst according to the orthogonal frequency division multiple access (OFDMA) technology and a second burst of the first subframe being an uplink burst according to the single carrier frequency division multiple access (SC-FDMA) technology;
        a first burst of a second subframe being a downlink burst according to the single carrier frequency division multiple access (SC-FDMA) technology and a second burst of the first subframe being an uplink burst according to the orthogonal frequency division multiple access (OFDMA) technology.

2. The apparatus of claim 1, wherein the frame handler is arranged to process the downlink bursts of the frame by performing modulation according to the respective access technologies.

3. The apparatus of claim 1, wherein the frame handler is arranged to process the uplink bursts of the frame by performing demodulation according to the respective access technologies.

4. The apparatus of claim 1, wherein each subframe comprises, in order, a downlink burst, a transmission transition gap, an uplink burst, and a receive transition gap; and wherein within the frame the plural subframes are consecutively arranged.

5. A wireless terminal which participates in a connection with a base station of a radio access network, the wireless terminal comprising:
    a transceiver configured for communicating a frame over an air interface with a base station;
    a frame handler arranged to process the frame as plural subframes, each subframe comprising at least one downlink burst and at least one uplink burst, each burst of the frame being separated from a succeeding burst by a transition gap, the frame handler being arranged to process at least one of the downlink bursts of the frame and at least one of the uplink bursts of the frame according to a first type of multiple access technology and to process at least one other downlink burst of the frame and at least one other uplink burst of the frame according to a second type of multiple access technology, wherein the first type of multiple access technology is orthogonal frequency division multiple access (OFDMA) technology and the second type of multiple access technology is single carrier frequency division multiple access (SC-FDMA) technology wherein the frame comprises two subframes,
   a first burst of a first subframe being a downlink burst according to the orthogonal frequency division multiple access (OFDMA) technology and a second burst of the first subframe being an uplink burst according to the single carrier frequency division multiple access (SC-FDMA) technology;
   a first burst of a second subframe being a downlink burst according to the single carrier frequency division multiple access (SC-FDMA) technology and a second burst of the first subframe being an uplink burst according to the orthogonal frequency division multiple access (OFDMA) technology.

6. The apparatus of claim 5, wherein the frame handler is arranged to process the downlink bursts of the frame by performing modulation according to the respective access technologies.

7. The apparatus of claim 5, wherein the frame handler is arranged to process the uplink bursts of the frame by performing demodulation according to the respective access technologies.

8. The apparatus of claim 5, wherein each subframe comprises, in order, a downlink burst, a transmission transition gap, an uplink burst, and a receive transition gap; and wherein within the frame the plural subframes are consecutively arranged.

9. A method of operating a radio access network comprising a base station which communicates over a radio interface with plural types of wireless terminals using frames of information, the method comprising:
   generating the frames to comprise plural subframes, each subframe comprising at least one downlink burst and at least one uplink burst, each burst of the frame being separated from a succeeding burst by a transition gap, at least one downlink burst of the frame being prepared according to a first type of multiple access technology and at least another downlink burst of the frame being prepared according to a second type of multiple access technology;
   communicating the frames between the base station and a first type of wireless terminal as well as between the base station and a second type of wireless terminal;
   at the first type of wireless terminal:
      processing the at least one downlink burst according to the first type of multiple access technology, and
      generating a first uplink burst according to the first type of multiple access technology;
   at the second type of wireless terminal:
      processing the at least one downlink burst according to the first type of multiple access technology,
      processing the at least another downlink burst according to the second type of multiple access technology; and
      generating a second uplink burst according to one of the first type of multiple access technology and the second type of multiple access technology.

10. The method of claim 9, further comprising the second type of wireless terminal dynamically determining in accordance with content of a downlink burst whether to generate the second uplink burst according to the first multiple access technology or the second multiple access technology.

11. The method of claim 10, further comprising the second type of wireless terminal generating an uplink burst of a first subframe according to the second multiple access technology and dynamically determining whether to generate an uplink burst of a second subframe according to either the first multiple access technology or the second multiple access technology.

12. The method of claim 9, wherein each subframe comprises, in order, a downlink burst, a transmission transition gap, an uplink burst, and a receive transition gap; and wherein within the frame the plural subframes are consecutively arranged.

13. The method of claim 9, wherein the frame comprises two subframes,
   a first burst of a first subframe being a downlink burst according to the orthogonal frequency division multiple access (OFDMA) technology and a second burst of the first subframe being an uplink burst according to the single carrier frequency division multiple access (SC-FDMA) technology;
   a first burst of a second subframe being a downlink burst according to the single carrier frequency division multiple access (SC-FDMA) technology and a second burst of the first subframe being an uplink burst according to the orthogonal frequency division multiple access (OFDMA) technology.

14. A base station of a radio access network comprising:
   a transceiver configured for communicating a frame of information over an air interface with a wireless terminal participating in a connection with the base station;
   a frame handler arranged to process the frame as plural subframes, each subframe comprising at least one downlink burst and at least one uplink burst, each burst of the frame being separated from a succeeding burst by a transition gap, the frame handler being arranged to process a downlink burst of a first subframe according to a first type of multiple access technology and to process an uplink burst of the first subframe according to a second type of multiple access technology, the frame handler further being arranged to use the downlink burst of the first subframe to apprise the wireless terminal whether an uplink burst of a second subframe of the frame is to be according to the first type of multiple access technology or the second type of multiple access technology, wherein the first type of multiple access technology is orthogonal frequency division multiple access (OFDMA) technology and the second type of multiple access technology is single carrier frequency division multiple access (SC-FDMA) technology;
   wherein the frame comprises two subframes:
      a first burst of a first subframe being a downlink burst according to the orthogonal frequency division multiple access (OFDMA) technology and a second burst of the first subframe being an uplink burst according to the single carrier frequency division multiple access (SC-FDMA) technology;
      a first burst of a second subframe being a downlink burst according to the single carrier frequency division multiple access (SC-FDMA) technology and a second burst of the first subframe being an uplink burst according to the orthogonal frequency division multiple access (OFDMA) technology.

15. A wireless terminal which participates in a connection with a base station of a radio access network, the wireless terminal comprising:
   a transceiver configured for communicating a frame over an air interface with a base station;

a frame handler arranged to process the frame as plural subframes, each subframe comprising at least one downlink burst and at least one uplink burst, each burst of the frame being separated from a succeeding burst by a transition gap, the frame handler being arranged to process a downlink burst of a first subframe according to a first type of multiple access technology and to process an uplink burst of the first subframe according to a second type of multiple access technology, the frame handler further being arranged to ascertain from the downlink burst of the first subframe whether the wireless terminal is to process an uplink burst of a second subframe of the frame according to the first type of multiple access technology or the second type of multiple access technology, wherein the first type of multiple access technology is orthogonal frequency division multiple access (OFDMA) technology and the second type of multiple access technology is single carrier frequency division multiple access (SC-FDMA) technology)

wherein the frame comprises two subframes:
  a first burst of a first subframe being a downlink burst according to the orthogonal frequency division multiple access (OFDMA) technology and a second burst of the first subframe being an uplink burst according to the single carrier frequency division multiple access (SC-FDMA) technology;
a first burst of a second subframe being a downlink burst according to the single carrier frequency division multiple access (SC-FDMA) technology and a second burst of the first subframe being an uplink burst according to the orthogonal frequency division multiple access (OFDMA) technology.

* * * * *

UNITED STATES PATENT AND TRADEMARK OFFICE
CERTIFICATE OF CORRECTION

PATENT NO. : 8,155,701 B2  
APPLICATION NO. : 12/259068  
DATED : April 10, 2012  
INVENTOR(S) : Balachandran et al.

Page 1 of 1

It is certified that error appears in the above-identified patent and that said Letters Patent is hereby corrected as shown below:

In Fig. 11, Sheet 13 of 14, for Tag "BF-n-1", in Line 1, delete "FLD" and insert -- FIELD --, therefor.

In Column 8, Line 58, delete "GRPS" and insert -- GPRS --, therefor.

In Column 22, Line 26, in Claim 1, delete "technology," and insert -- technology; --, therefor.

In Column 23, Line 6, in Claim 5, delete "technology" and insert -- technology; --, therefor.

In Column 26, Line 2, in Claim 15, delete "technology)" and insert -- technology; --, therefor.

Signed and Sealed this
Eleventh Day of September, 2012

David J. Kappos
*Director of the United States Patent and Trademark Office*